(12) United States Patent
Fountain et al.

(10) Patent No.: US 12,140,074 B2
(45) Date of Patent: Nov. 12, 2024

(54) INTERNAL COMBUSTION ENGINE HAVING CRANKSHAFT GUIDE

(71) Applicant: ASF Technologies (Australia) Pty Ltd, Sydney (AU)

(72) Inventors: Graham Harry Fountain, Sydney (AU); Emmanuel Kavarnos, Sydney (AU); Dimitrios Psonis, Sydney (AU); Richard Terrence Tamba, Sydney (AU)

(73) Assignee: ASF Technologies (Australia) Pty Ltd, Sydney (AU)

( * ) Notice: Subject to any disclaimer, the term of this patent is extended or adjusted under 35 U.S.C. 154(b) by 0 days.

(21) Appl. No.: 17/772,356

(22) PCT Filed: Oct. 29, 2020

(86) PCT No.: PCT/AU2020/051170
§ 371 (c)(1),
(2) Date: Apr. 27, 2022

(87) PCT Pub. No.: WO2021/081586
PCT Pub. Date: May 6, 2021

(65) Prior Publication Data
US 2022/0381180 A1 Dec. 1, 2022

(30) Foreign Application Priority Data
Oct. 29, 2019 (AU) .................................. 2019904074

(51) Int. Cl.
*F02B 75/24* (2006.01)
*F01B 9/02* (2006.01)
(Continued)

(52) U.S. Cl.
CPC .............. *F02B 75/246* (2013.01); *F01B 9/02* (2013.01); *F02B 75/32* (2013.01); *F16H 21/36* (2013.01)

(58) Field of Classification Search
CPC ........ F16H 21/36; F02B 75/32; F02B 75/246; F01B 9/02
See application file for complete search history.

(56) References Cited

U.S. PATENT DOCUMENTS 2,513,514 A 7/1950 Poage
4,825,820 A * 5/1989 Morgan .................. F02B 75/28
123/53.5

(Continued)

FOREIGN PATENT DOCUMENTS

DE 10 2007 056203 A1 11/2008
EP 0241243 A2 10/1987

OTHER PUBLICATIONS

Dec. 23, 2020—(WO) International Search Report and Written Opinion—PCT/AU2020/051170.

(Continued)

*Primary Examiner* — Kevin A Lathers
(74) *Attorney, Agent, or Firm* — Banner & Witcoff, Ltd.

(57) ABSTRACT

An internal combustion engine, including a pair of opposed pistons, a pair of opposed cylinders, and an output shaft, wherein each of the pistons is arranged for reciprocating motion within a respective one of the cylinders, driven by combustion, and the pistons are coupled to the output shaft by a coupling such that said reciprocating motion of the pistons drives rotation of the output shaft, wherein the coupling includes a unitary connecting rod coupled to the opposed pistons, the connecting rod having side guides for guiding a slider bearing located for reciprocating movement relative to the connecting rod, and the coupling further includes a crankshaft rotatably mounted within the slider (Continued)

bearing, the crankshaft having at least one guide shoulder for supporting axial location relative to the slider bearing.

18 Claims, 25 Drawing Sheets

(51) Int. Cl.
  *F02B 75/32* (2006.01)
  *F16H 21/36* (2006.01)

(56) References Cited

U.S. PATENT DOCUMENTS

| | | | | |
|---|---|---|---|---|
| 5,331,926 | A * | 7/1994 | Vaux | F01B 9/026 |
| | | | | 123/196 R |
| 2007/0079787 | A1* | 4/2007 | Raffaele | F02B 75/222 |
| | | | | 123/193.6 |
| 2010/0154749 | A1* | 6/2010 | Barberato | F02B 75/32 |
| | | | | 123/48 C |
| 2010/0212637 | A1* | 8/2010 | Lemke | F01B 7/14 |
| | | | | 123/193.2 |
| 2013/0019835 | A1 | 1/2013 | Flenche | |
| 2019/0100295 | A1 | 4/2019 | Jukes | |

OTHER PUBLICATIONS

Jun. 22, 2023—(EP) Supplemental European Search Report—App 20881761.9.

* cited by examiner

| 128 | 208 | 416 | 830 |
|-----|-----|-----|-----|
| 130 | 2 | 4 | 8 |
| 132 | 0.75L | 1.5L | 3.0L |
| 134 | 25kW | 60kW | 125kW |

| | | |
|---|---|---|
| 136 | = | 85 mm |
| 138 | = | 75 mm |
| 140 | = | 21" |
| 142 | = | 29.5 mm |
| 144 | = | 22" |
| 146 | = | 24.8 mm |
| 148 | | 0.56 |
| 150 | = | 11 |

| 194 | 415 |
|-----|-----|
|     | 232 |
| 196 | ✓ |
| 198 | ✓ |
| 200 | ✓ |
| 202 | ✓ |
| 204 | ✓ |
| 206 | ✓ |
| 208 | ✓ |
| 210 | ✓ |
| 212 | ✓ |
| 214 | ✓ |
| 216 | ✓ |
| 218 | ✓ |
| 220 | ✓ |
| 222 |   |
| 224 | ✓ |
| 226 | ✓ |
| 228 | ✓ |
| 230 | ✓ |

*FIG. 15*

INTERNAL COMBUSTION ENGINE HAVING CRANKSHAFT GUIDE

CROSS-REFERENCE TO RELATED APPLICATIONS

This application is a U.S. National Stage application under 35 U.S.C. § 371 of International Application PCT/AU2020/051170, filed Oct. 29, 2020, which claims the benefit of priority to Application AU 2019904074, filed Oct. 29, 2019. Benefit of the filing date of each of these prior applications is hereby claimed. Each of these prior applications is hereby incorporated by reference in its entirety.

FIELD OF THE INVENTION

This invention relates to an internal combustion engine. More particularly, but not exclusively, the invention relates to an internal combustion engine with piston motion characteristics leading to improved performance.

BACKGROUND OF THE INVENTION

It is known to provide an internal combustion engine for powering items such as a vehicle, generator, machinery or the like. Traditional conventional internal combustion engines use a crankshaft, crankpins and connecting rods. However the applicant has identified that there are limitations in noise, smoothness, efficiency and emissions of conventional internal combustion engines.

Examples of the present invention seek to avoid or at least ameliorate the disadvantages of existing internal combustion engines.

SUMMARY OF THE INVENTION

In accordance with one aspect of the present invention, there is provided an internal combustion engine, including a pair of opposed pistons, a pair of opposed cylinders, and an output shaft, wherein each of the pistons is arranged for reciprocating motion within a respective one of the cylinders, driven by combustion, and the pistons are coupled to the output shaft by a coupling such that said reciprocating motion of the pistons drives rotation of the output shaft, wherein the coupling includes a unitary connecting rod coupled to the opposed pistons, the connecting rod having side guides for guiding a slider bearing located for reciprocating movement relative to the connecting rod, and the coupling further includes a crankshaft rotatably mounted within the slider bearing, the crankshaft having at least one guide shoulder for supporting axial location relative to the slider bearing.

Preferably, the crankshaft has a pair of opposed guide shoulders for locating at or near opposed sides of the slider bearing. More preferably, the shoulders are spaced to provide a gap between the slider bearing and the shoulders. Even more preferably, the gap is sufficient to allow relative movement of the slider bearing axially between the shoulders to allow the unitary connecting rod to self-centre relative to the crankshaft.

In a preferred form, the engine is provided with a pin coupling to accommodate bore misalignment. More preferably, the pin coupling accommodates twist in one or more directions. Even more preferably, the pin coupling accommodates crank to bore misalignment.

Preferably, the shoulders are tapered radially outwardly to each have a larger inner radius facing the slider bearing. More preferably, the shoulders are tapered outwardly toward the slider bearing so as to provide a larger guide shoulder surface for abutment to limit movement relative to the slider bearing.

In one form, the crankshaft is provided with a lubrication passage directed radially outwardly toward an inside surface of the slider bearing.

There is also disclosed an internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, the coupling being arranged such that the piston has sinusoidal motion for constant rotational velocity of the output shaft (or when plotted against rotational angle of the output shaft).

Preferably, the engine is in the form of a scotch yoke engine.

In a preferred form, the coupling includes a slider bearing. More preferably, the engine includes a pair of opposed pistons which are mutually rigidly fixed.

Preferably, the engine is arranged such that, when measured against a conventional crankshaft engine of identical bore and stroke, the motion of the piston after top dead centre has a lower acceleration such that volumetric difference in the cylinder, when compared to the conventional crankshaft engine, peaks at between 10% and 20% between top dead centre and bottom dead centre.

More preferably, the engine is arranged such that, when measured against a conventional crankshaft engine of identical bore and stroke, the motion of the piston after top dead centre has a lower acceleration such that volumetric difference in the cylinder peaks at between 15% and 17% between top dead centre and bottom dead centre.

Even more preferably, the engine is arranged such that, when measured against a conventional crankshaft engine of identical bore and stroke, the motion of the piston after top dead centre has a lower acceleration such that volumetric difference in the cylinder peaks at between 40 and 80 degrees of output shaft rotation after top dead centre.

In one form, the engine is arranged such that, when measured against a conventional crankshaft engine of identical bore and stroke, the motion of the piston after top dead centre has a lower acceleration such that volumetric difference in the cylinder peaks at between 50 and 70 degrees of output shaft rotation after top dead centre.

It is preferred that the engine is arranged, such that, when measured against a conventional crankshaft engine of identical bore and stroke, the motion of the piston after top dead centre has a lower acceleration such that volumetric difference in the cylinder peaks at between 50 and 60 degrees of output shaft rotation after top dead centre.

In one form, the engine includes a combustion chamber, and the combustion chamber and/or the coupling is/are arranged to achieve goal volumetric difference characteristics, when compared to a conventional crankshaft engine.

There is also disclosed a method of manufacturing an engine as described above, including:
  measuring and/or modelling charge density in the cylinder to obtain data; and
  using said data to optimise one or more parameter(s) of the engine so as to increase maintenance of a gas state with a higher charge density around top dead centre.

Preferably, the method includes the step of using said data to optimise one or more parameter(s) of the engine, said parameter(s) including one or more of the coupling, the piston, the cylinder, a combustion chamber, and valves.

More preferably, the method includes the step of using said data to optimise one or more parameter(s) of the engine so as to increase maintenance of a gas state with a higher charge density around top dead centre to achieve improved fuel mixing.

Preferably, the internal combustion engine includes an intake system arranged to induce cyclonic airflow in a plenum chamber of the intake system. More preferably, a firing order of the cylinders is 1-2-4-3. Even more preferably, the intake system is arranged such that intake conduits leading to the cylinders meet at the plenum chamber and are arranged generally in a circular configuration about the plenum chamber in the firing order of the cylinders.

BRIEF DESCRIPTION OF THE DRAWINGS

The invention is further described by way of non-limiting example only with reference to the accompanying drawings, in which:

FIGS. 5 to 17 show tables and diagrams to explain advantages of an internal combustion engine in accordance with an example of the present invention, over a conventional internal combustion engine;

DETAILED DESCRIPTION

Figure 1:
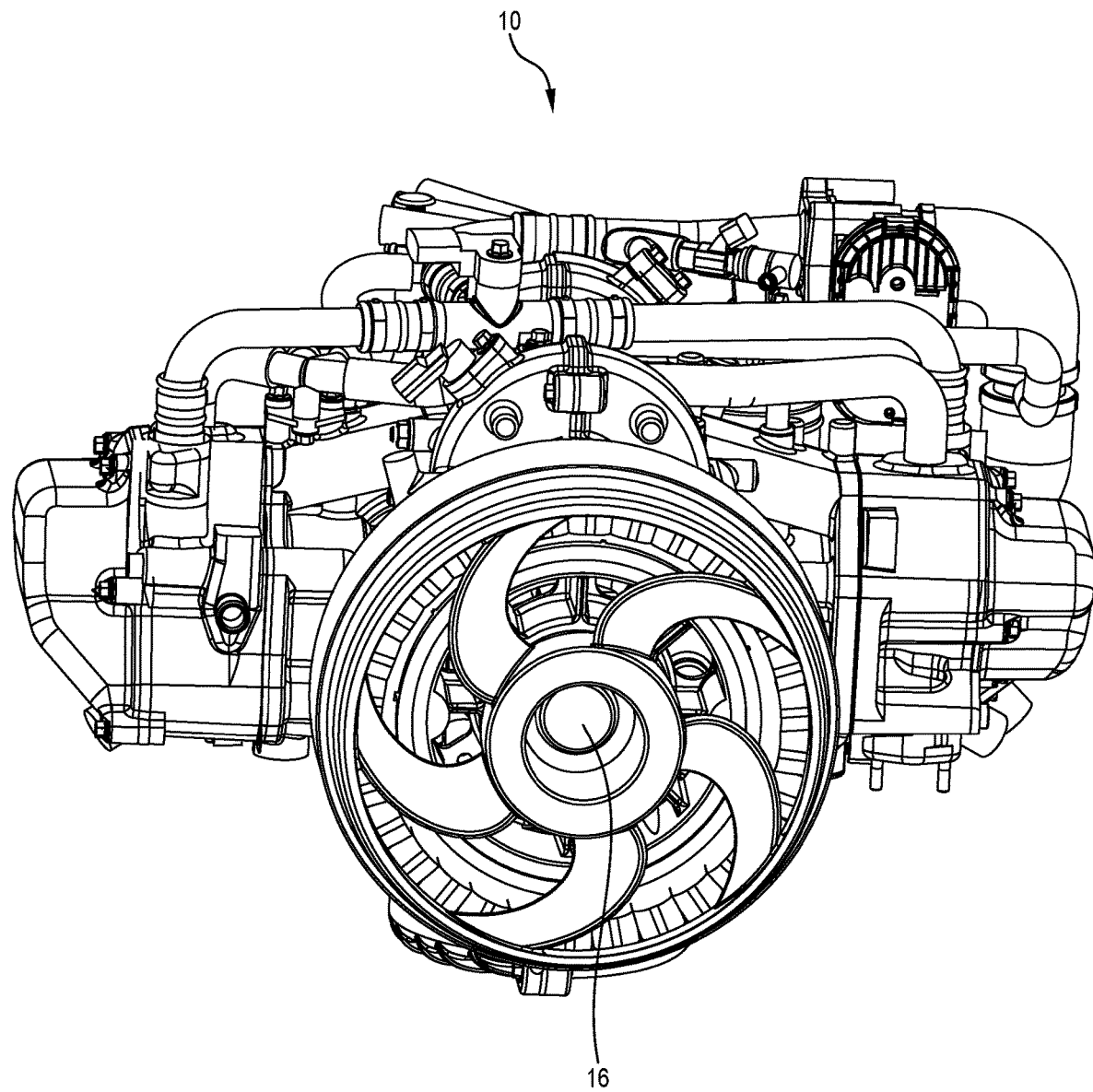
FIG. 1 shows a perspective view of an engine in accordance with an example of the present invention.

FIGS. 1 to 4 depict operation of an internal combustion engine in accordance with an example of the present invention.

More specifically, in accordance with an example of the present invention, the applicant has developed an internal combustion engine 10, including a cylinder 12, a piston 14 (also reference numeral 92 in FIG. 5), and an output shaft 16, wherein the piston 14 is arranged for reciprocating motion within the cylinder 12, driven by combustion, and the piston 14 is coupled to the output shaft 16 by a coupling. The engine 10 is configured such that said reciprocating motion of the piston 14 drives rotation of the output shaft 16. The coupling is arranged such that the piston 14 has sinusoidal motion when plotted against rotational angle of the output shaft 16.

In the example depicted in the drawings, the engine 10 is in the form of a scotch yoke engine, as shown in FIG. 1, and the coupling includes a slider bearing 90 (or slider block) which is able to slide along a channel formed between opposed connecting rods 86. The engine 10 of the example includes a pair of opposed pistons 14 which are mutually rigidly fixed such that movement of one piston in a first direction causes movement of the other piston in a second direction which is opposite to the first direction (see also pistons 92 in FIG. 5).

Figure 2:
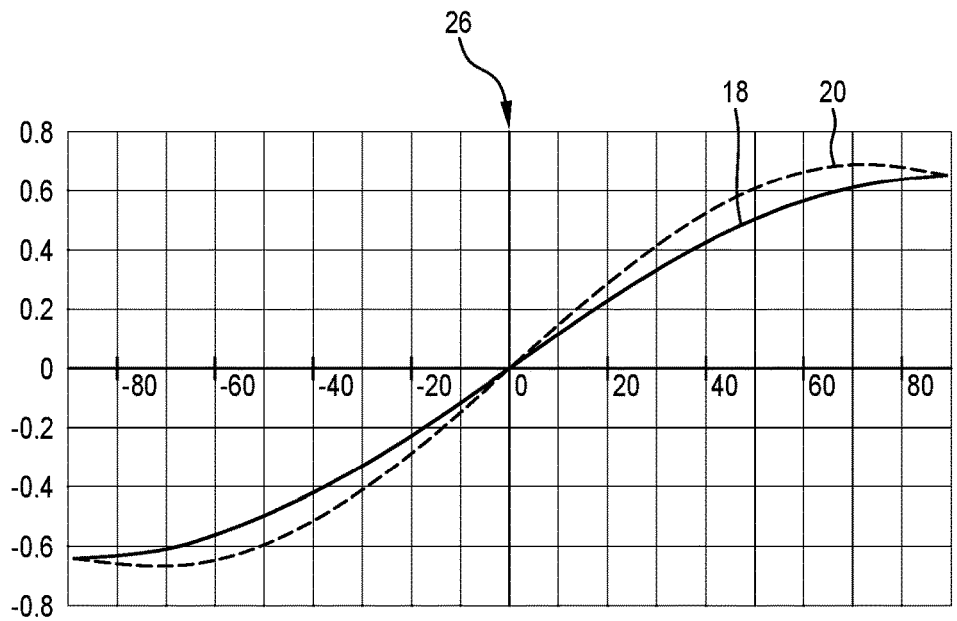
FIG. 2 shows a graph of piston velocity of an engine in accordance with an example of the present invention against motion of a piston of a conventional engine, before and after zero velocity at top dead centre.
Figure 3:
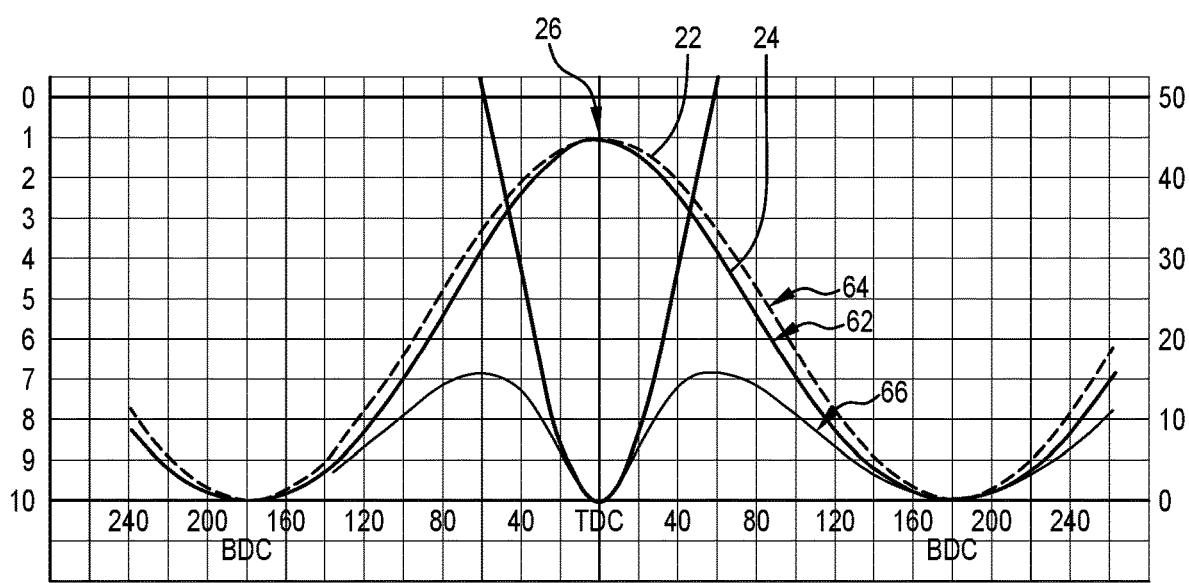
FIG. 3 shows a graph depicting total working unit cylinder volume versus crank angle for an engine in accordance with an example of the present invention as well as for a conventional engine.

With reference to FIGS. 2 and 3, the engine 10 is arranged such that, when measured against a conventional crankshaft engine of identical bore and stroke, the motion of the piston 14 after top dead centre ("TDC") has a lower displacement, velocity and acceleration such that volumetric difference in the cylinder 12, when compared to the conventional crankshaft engine, peaks at between 10% and 20% between TDC and bottom dead centre ("BDC"). In FIG. 2, velocity of the piston 14 of the engine 10 according to an example of the present invention is shown by line 18, whereas velocity of a piston of a conventional engine having identical bore and stroke (to engine 10) is shown by line 20. In FIG. 3, Total Working Unit Cylinder Volume of the engine 10 according to an example of the present invention is shown by line 22, whereas Total Working Unit Cylinder Volume of a conventional engine having identical bore and stroke (to engine 10) is shown by line 24. With regard to FIG. 3, motion of the piston 14 is sinusoidal such that velocity of the piston 14 is greater around TDC 26 (than for a conventional engine) whereas velocity of the piston 14 is less around BDC 28 (than for a conventional engine).

Looking specifically at FIG. 3, the engine 10 is arranged such that, when measured against a conventional crankshaft engine of identical bore and stroke, the motion of the piston 14 after TDC 26 has a lower acceleration such that volumetric difference in the cylinder 12 peaks at between 15% and 17% between TDC 26 and BDC 28. In the example shown, the engine 10 is arranged such that, when measured against a conventional crankshaft engine of identical bore and stroke, the motion of the piston 14 after TDC 26 has a lower acceleration such that volumetric difference in the cylinder 12 peaks at between 40 and 80 degrees of output shaft rotation after TDC 26. This peak may, more specifically, be between 50 and 70 degrees of output shaft rotation after TDC. Even more specifically, this peak may be between 50 and 60 degrees of output shaft rotation after TDC 26.

The engine 10 includes a combustion chamber 30 for combustion of the charge, and the combustion chamber 30 and/or the coupling is/are arranged to achieve goal volumetric difference characteristics, when compared to a conventional crankshaft engine.

The applicant has, advantageously, identified a method of manufacturing (and, specifically, designing) an engine 10, the method including the steps of measuring and/or modelling charge density in the cylinder 12 to obtain data; and using the data to optimise one or more parameter(s) of the engine 10 so as to increase maintenance of a gas state with a higher charge density around TDC 26. The method may include the step of using the data to optimise one or more parameter(s) of the engine 10, the parameter(s) including one or more of the coupling, the piston 14, the cylinder 12, the combustion chamber 30, and valves 32.

The method may include the step of using the data to optimise one or more parameter(s) of the engine 10 so as to increase maintenance of a gas state with a higher charge density around TDC 26 to achieve improved fuel mixing.

As discussed above, with reference to FIG. 3, movement of the piston 14 in the engine 10 is sinusoidal. The movement of the piston 14 against crank angle over top dead centre 26 and bottom dead centre 28 are identical, as shown by the sinusoidal curve of line 22 in FIG. 3.

In contrast, the crank and connecting rod mechanism of conventional engines produces unequal piston movement in the region of TDC 26 and BDC 28 (see line 24 in comparison to line 22). In the region of TDC 26 the piston of the conventional engine moves faster than in the engine 10 of present invention and, in the region of BDC 28, the piston of the conventional engine moves slower than in the engine 10 of the present invention. For a given engine stoke the difference between these two conditions depends on the length of a con rod. The shorter the con rod, the greater the differences.

The power level for a given piston displacement is very much a function of the amount of air mass captured per cycle affecting the engine volumetric efficiency. Volumetric efficiency depends on several engine design parameters, namely; cam profile, valve timing, manifold tuned length, forced air induction (Turbo/Supercharging) etc. which are optimised for the pressure wave dynamics set by any given piston motion. Therefore, the processes that will be influenced by piston motion can be divided into two categories; induction process and post induction processes.

The present invention focusses on the post induction processes ie.: compression, combustion and expansion, being influenced by the piston motion. The applicant has identified that it is of particular interest to note the production of NOx emissions in the combustion processes and the expansion stroke (post combustion) when the useful work is produced. In order to understand the advantages of the engine 10 of the present invention and, in particular, the advantage of the motion of the piston 14 over that of a conventional engine we must first compare an identical volumetric efficiency and piston bore and stroke to have identical induction conditions for both the engine 10 of the present invention and a conventional engine.

In the graph shown in FIG. 2, two engines of differing piston motion but otherwise identical in other respects (with identical volumetric efficiency and identical bore and stroke) were compared under the same engine speed, load (full power) and air-fuel ratio.

Piston velocity in this unit (mm/degree crank) is independent of engine speed and hence is characteristic of piston motion over the entire speed range. Clearly, the piston 14 of the engine 10 approaches and goes away from TDC 26 at a lower acceleration (rate of change of velocity) than the conventional piston. This means the engine 10 will have a lower rate of cylinder volume change around TDC 26 and therefore will help maintain a gas state with higher charge density around TDC 26. The applicant has identified that a higher charge density assists the flame to speed up. The lower piston acceleration extends over a considerable part of the gas expansion duration.

When computed over the entire speed range, the cylinder peak pressures are found to be lower in the engine 10 than in the conventional engine in most speeds except for the lower speeds of 1500 and 2500 r/min where the peak pressures are very similar. However, cylinder pressure during the gas expansion process (i.e. after mass fraction burned has reached 1.0) remains higher in the engine 10 compared with that in the conventional engine providing more useful work (and a higher IMEP) for the engine 10.

The subject of combustion needs far deeper treatment due to other complex engine related parameters, ie: squish velocity (including the geometry of the squish surfaces) and heat losses through surface (influenced by combustion chamber geometry, piston-con rod connection responsible for uniformity of temperature of piston crown around the joint face, cooling water circuit, etc.). But importantly, all of these contribute to the development of the resultant cylinder pressure (profile) which is responsible for the power level and emissions that are achieved.

Figure 4:
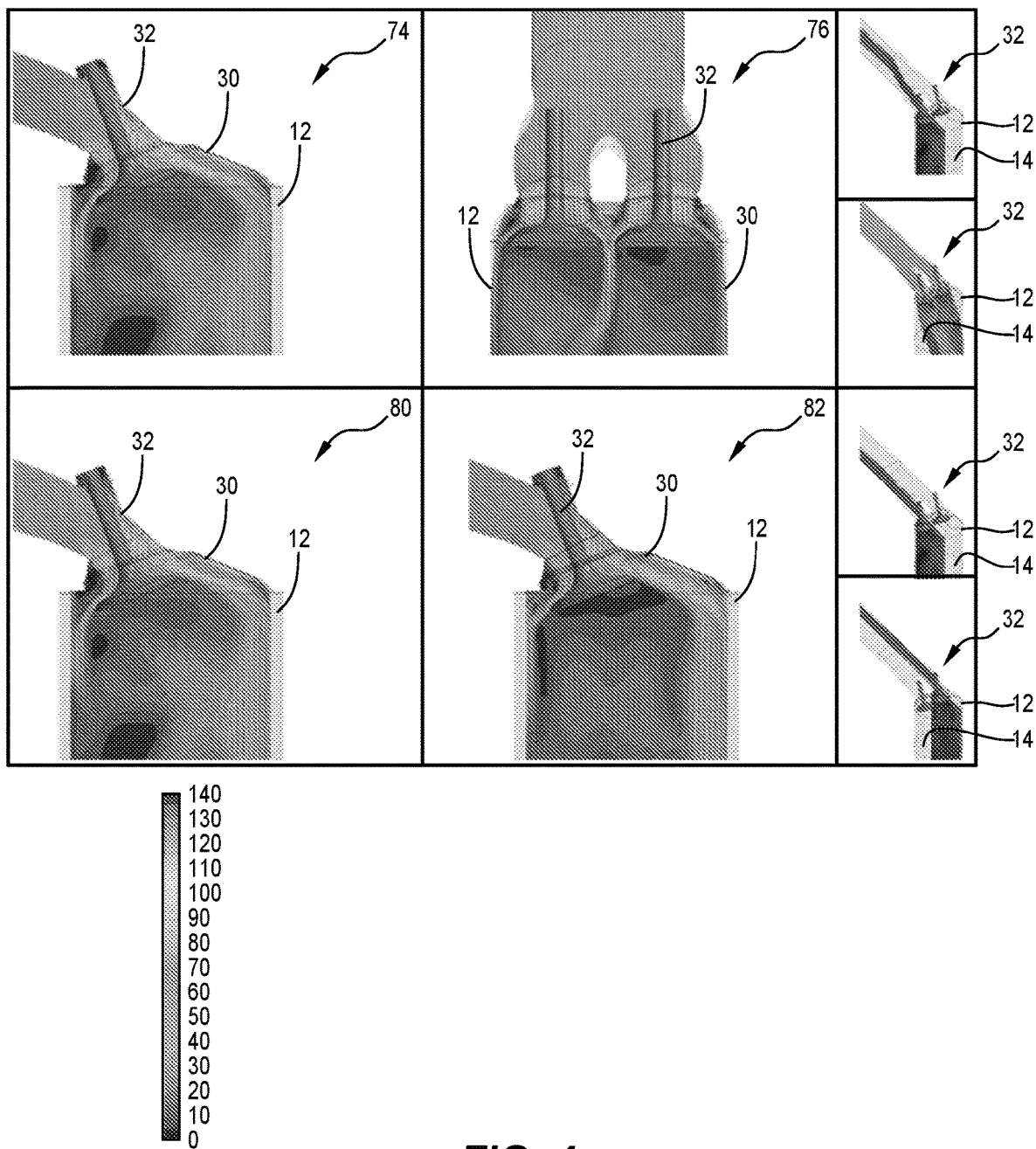
FIG. 4 shows modelling results of an engine in accordance with an example of the present invention.

As shown in FIG. 4, there are shown modelling results of the engine 10 according to an example of the present invention, depicting the near perfect airflow tumble as it enters and fills the cylinder 12 resulting in homogenous fuel mixing giving cleaner combustion, high torque and lower emissions.

The piston 14 approaches and goes away from TDC 26 at a lower acceleration than the conventional piston with both engines having identical stroke and bore. This means the engine 10 will have a lower rate of cylinder volume change around TDC 26 and the applicant has identified that this helps maintain a gas state with higher charge density around TDC 26, leading to homogenous fuel mixing resulting in cleaner combustion, more engine knock resistance, high EGR tolerance, high torque and lower emissions.

In one example, the applicant has identified that the engine 10 may be used to drive a generator in a hybrid vehicle. More specifically, the applicant has identified that the engine 10 may be used to drive a generator in a series hybrid vehicle, possibly with the engine being operated at constant rotational velocity during running of the generator which may be located in a discrete location of the vehicle, such as in the boot/trunk. The efficiency, balance, low vibration and quietness of the engine 10 may make the engine 10 particularly suitable to such an application.

Targeted Engine Lubrication and Oil Pump Arrangement

In many traditional engines, oil pressure is generated by an oil pump driven by the crankshaft. When excess oil pressure and flow is achieved by the oil pump at higher engine speeds, this excess oil is redirected by a pressure regulating device back into the suction port of the pump or back to the sump via an exhaust passage. Normally, in a range extender engine, when the engine is at low engine speeds, the engine has low oil pressure but is also at low load. When the engine speed is increased, so too is the load and correspondingly the oil pressure and flow is also increased to a point where the pump generates excess oil that is not normally used and is redirected back to the engine sump or back to the pump suction port.

With reference to FIGS. 19 to 31, the following invention, outlines several methods of targeting lubrication to the areas of an engine that need it most and a method of using this excess oil to the advantage of the engine by redirecting this excess oil in the first case to other areas of the engine and then if the pump still has excess oil available, only then would the oil be redirected back to the suction port of the pump or to the sump.

This aspect of the patent specification covers the following key areas:
  The use of an angled slider block and bearing to cause an uninterrupted slider bearing face
  The direct deposition of bearing-type material onto the uninterrupted slider bearing face of the slider block
  A two stage regulator in the pump lube circuit that has a primary and secondary relief function whereby the primary relief creates oil pressure and flow that is targeted at specific areas of the engine in high engine load situations Targeted piston cooling using spray jets on the slider block Targeted piston cooling using primary relief oil from the regulator via spray jets inside the engine Targeted piston cooling using slider bearing excess oil via spray jets on the connecting rod Unique controlled lubrication from the shell bearings to the side faces of the slider block using notches or impressions or controlled surface finishes and leakage A pre-set regulator in the lube circuit that redirects oil that is targeted at specific areas of the engine in high engine load situations The result is:

Less wastage of oil from the oil pump

A controlled re-direction of normally wasted oil to critical areas of the engine where it can be of benefit Less oil foaming Improved engine efficiency Improved engine performance Piston cooling A reduction in friction as targeted lubrication can result in smaller bearing surfaces In addition, the use of a slider block in a scotch yoke engine requires specific targeted lubrication to maintain a boundary layer of oil on the sliding bearing surfaces.

Figure 25:
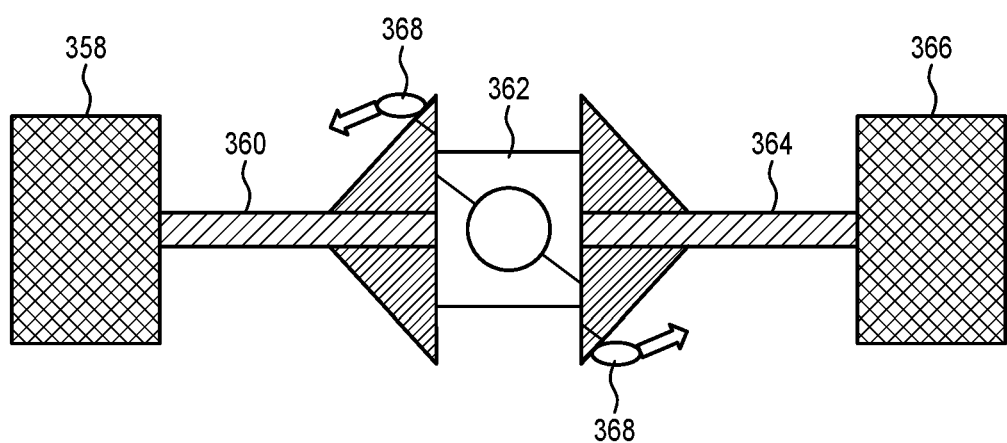
Figure 26:
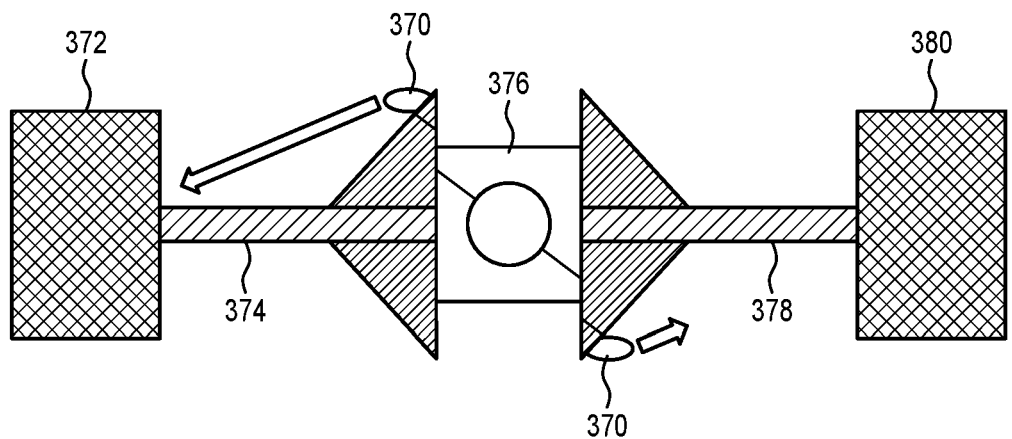

With reference to FIG. 25, piston sprays in engine block that are fed from excess oil from slider block. Slider block oil gallery aligns with spray nozzle and supplies oil to jet at the top and bottom of each stroke (jets closed in this view). Turning to FIG. 26, Piston Sprays in engine block that are fed from excess oil from slider block. Slider block oil gallery aligns with spray nozzle and supplies oil to jet at the top and bottom of each stroke (top jet open in this view).

Figure 27:
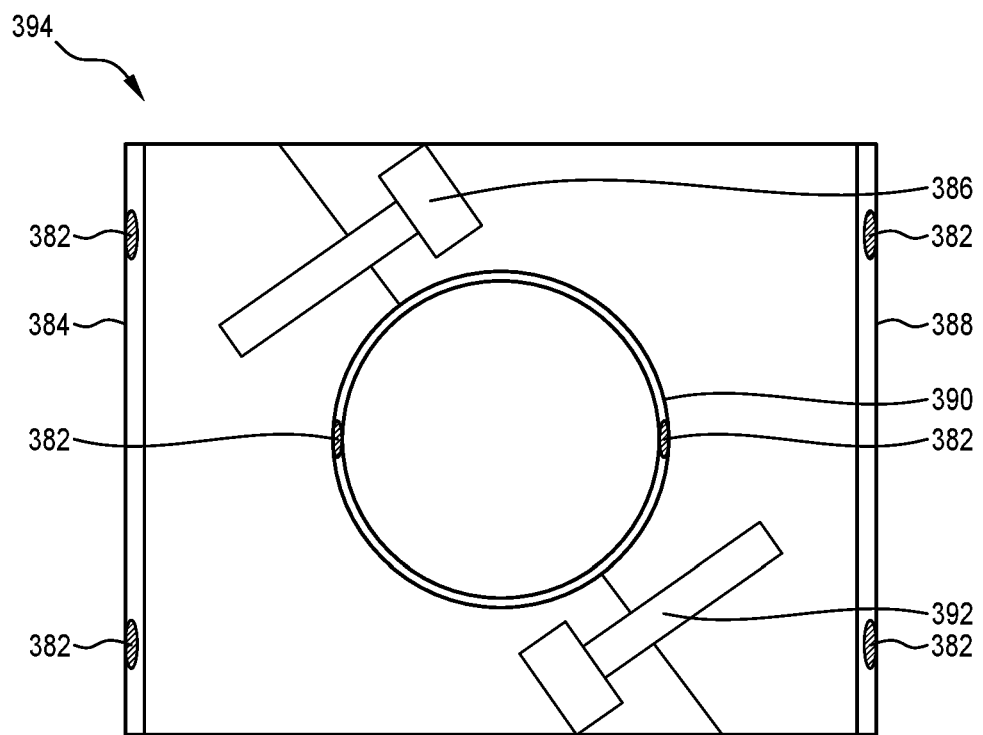
Figure 28:
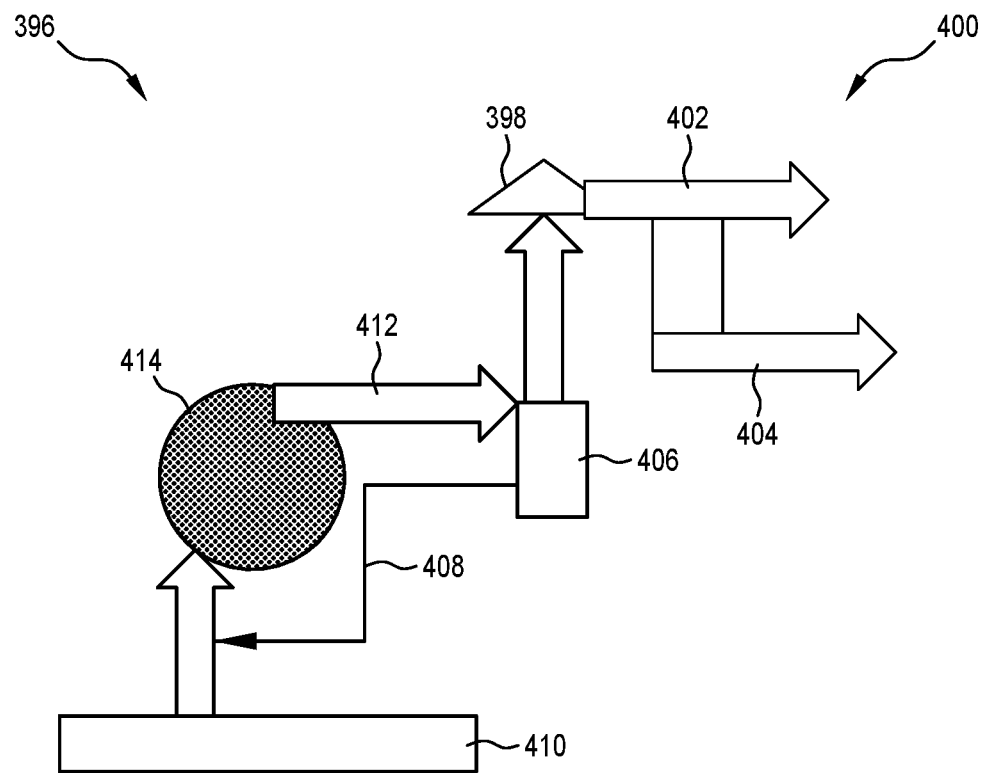
Figure 29:
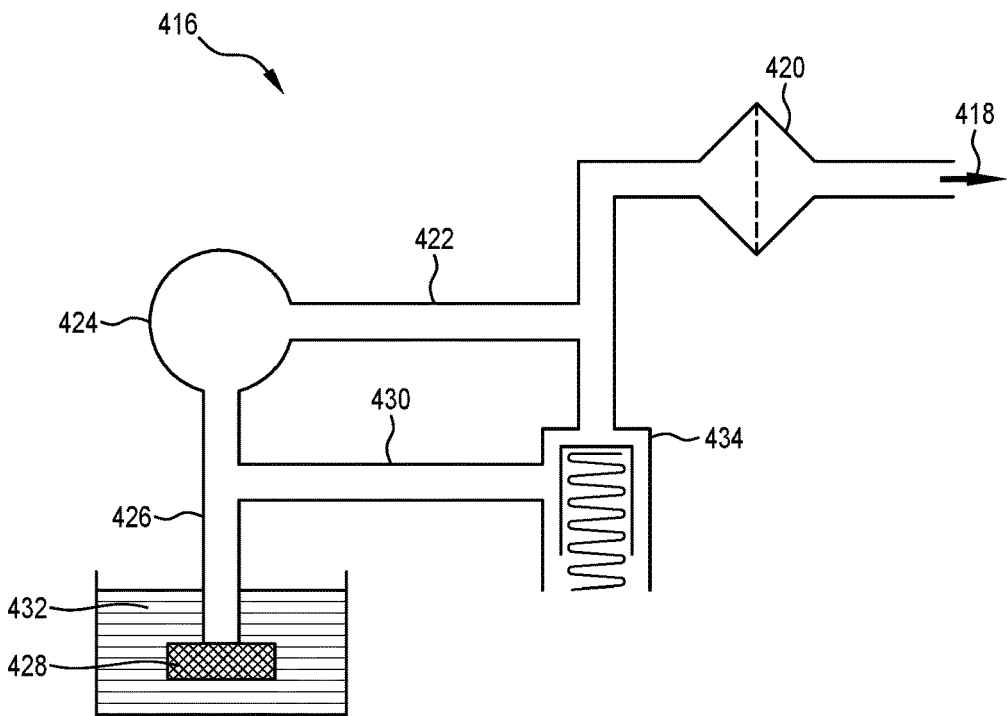
FIGS. 29 to 31 show diagrams of a two-stage blow-off valve and a blow-off (intermediate) regulator.
Figure 30:
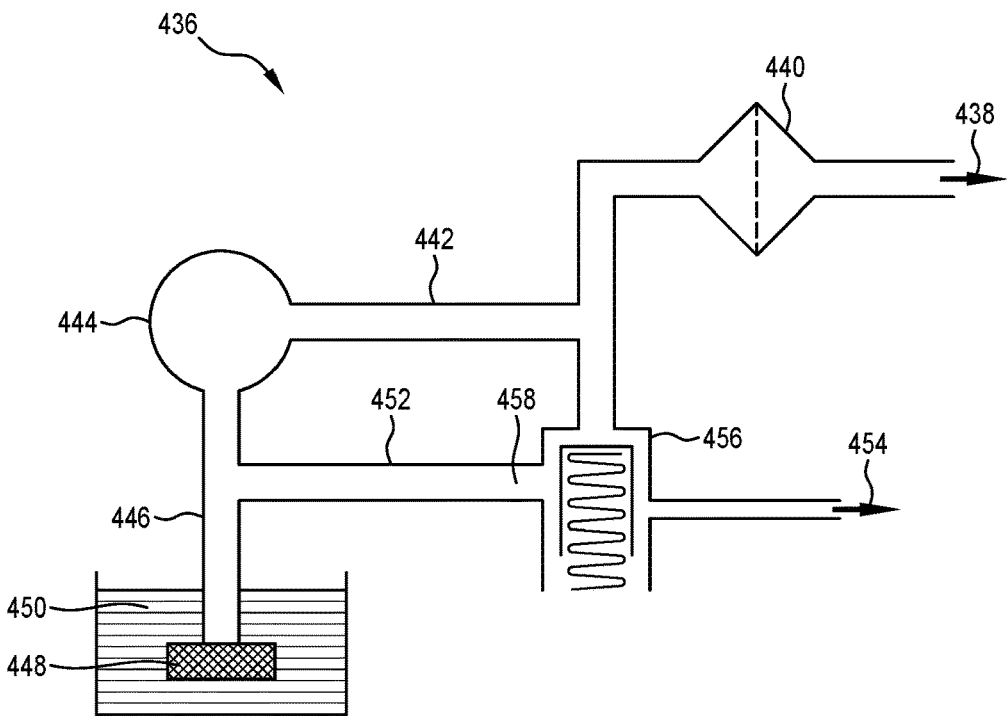
Figure 31:
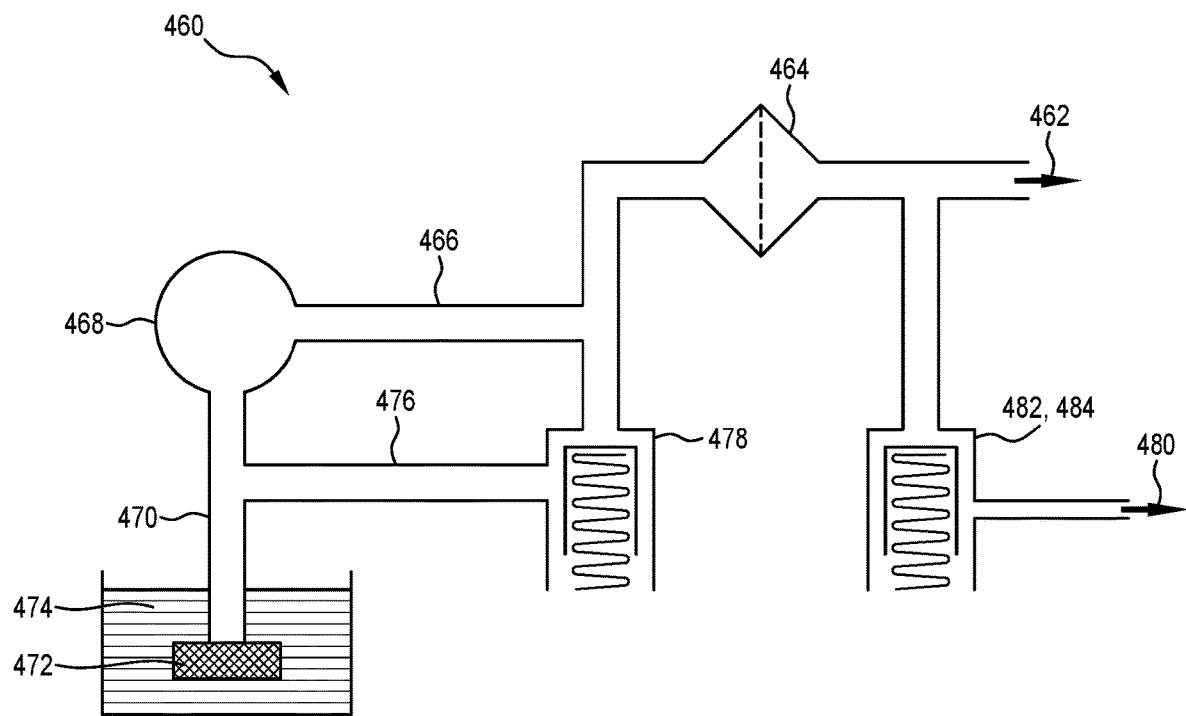
Figure 32:
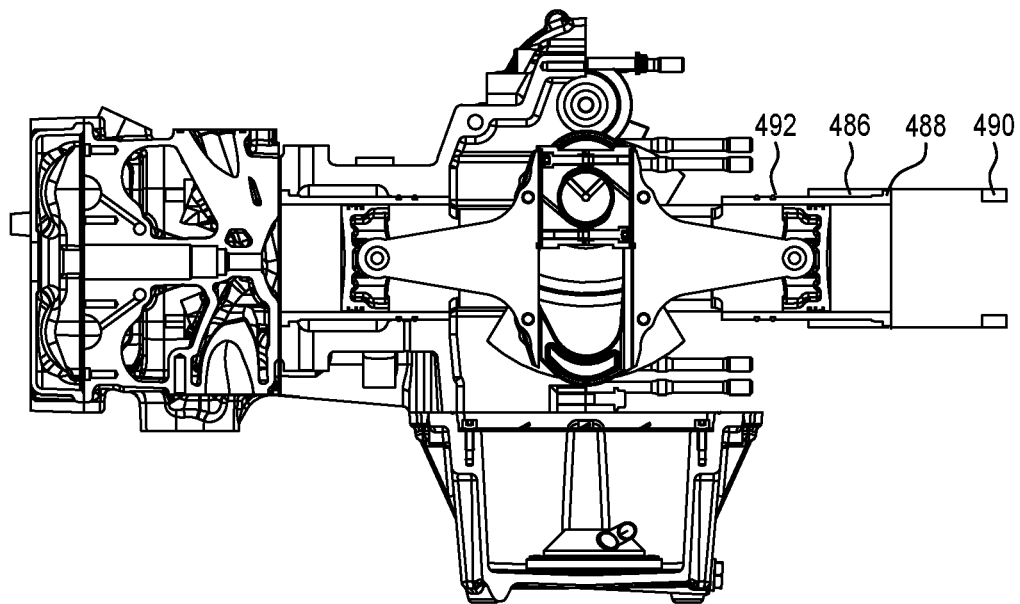
FIGS. 32 to 35 depict a guide shoulder arrangement.
Figure 33:
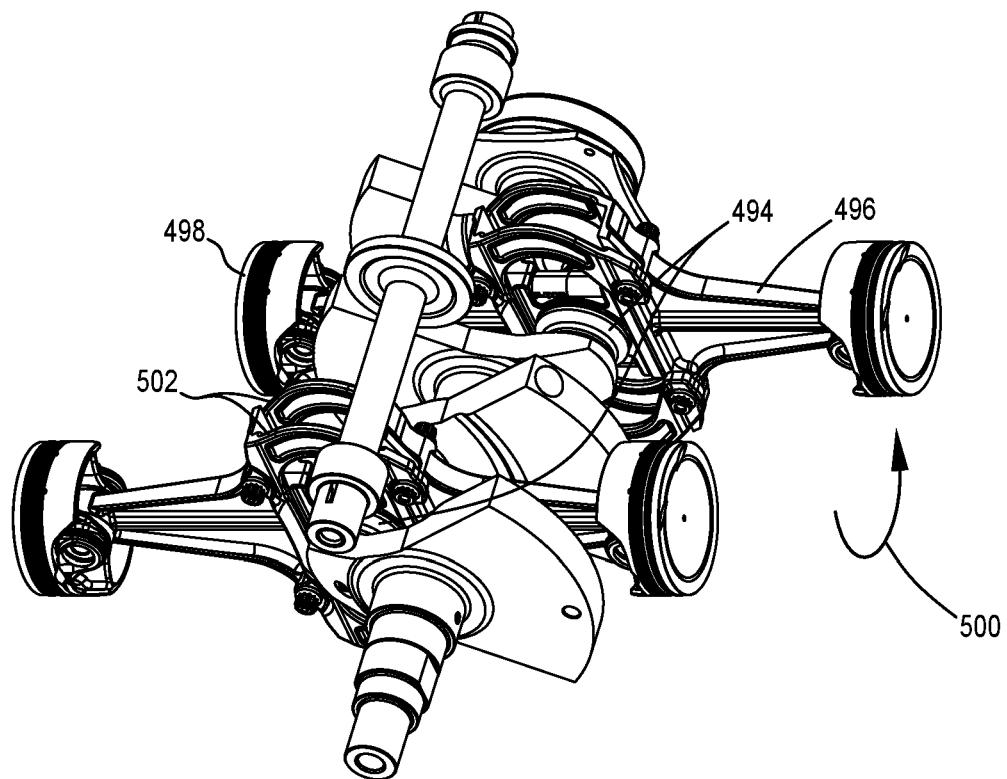
Figure 34:
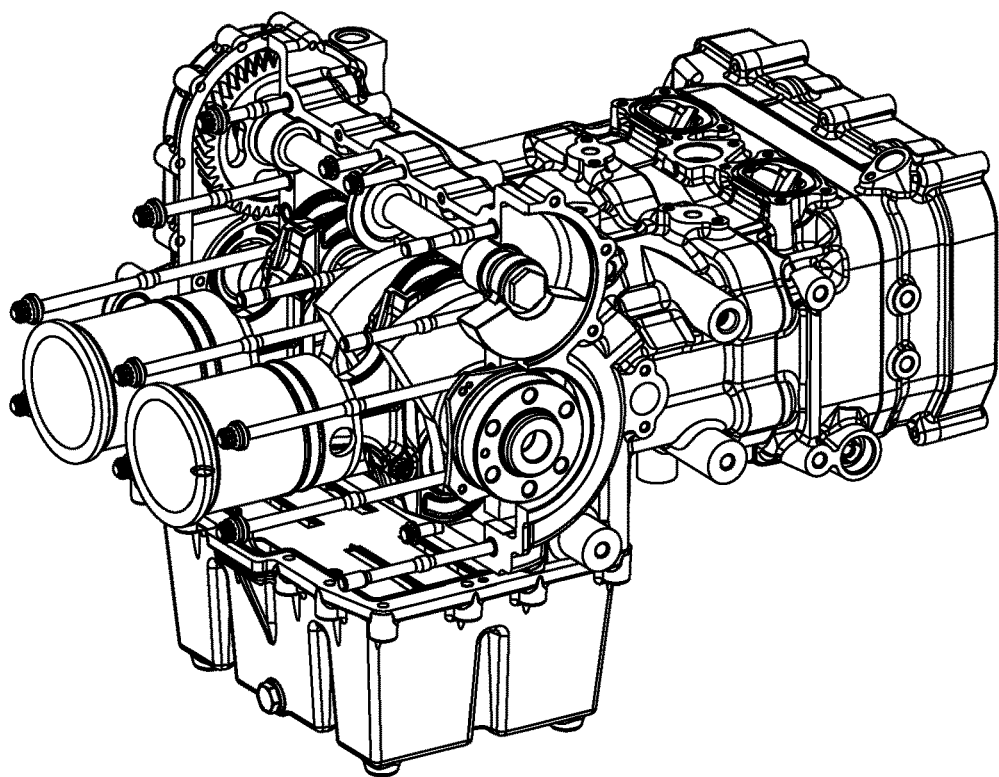
Figure 35:
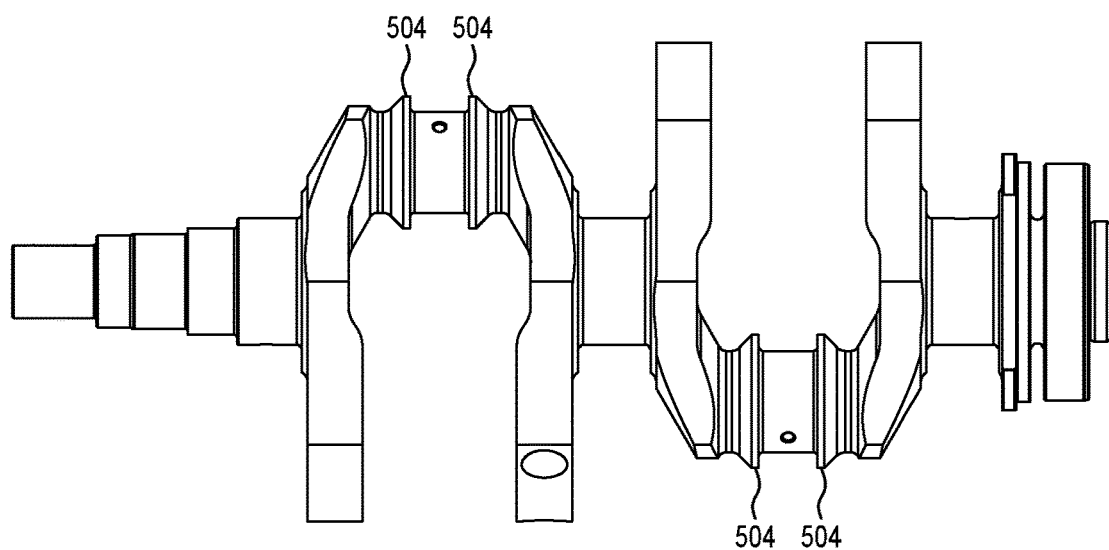
Figure 36:
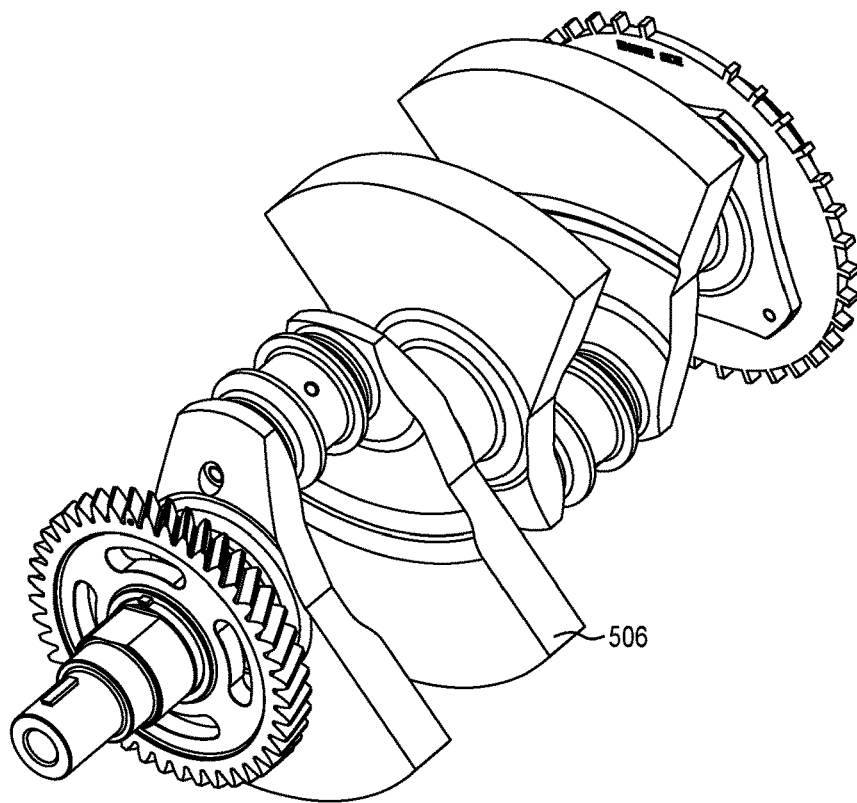
FIGS. 36 and 37 show a crank assembly in isometric and exploded views.
Figure 38:
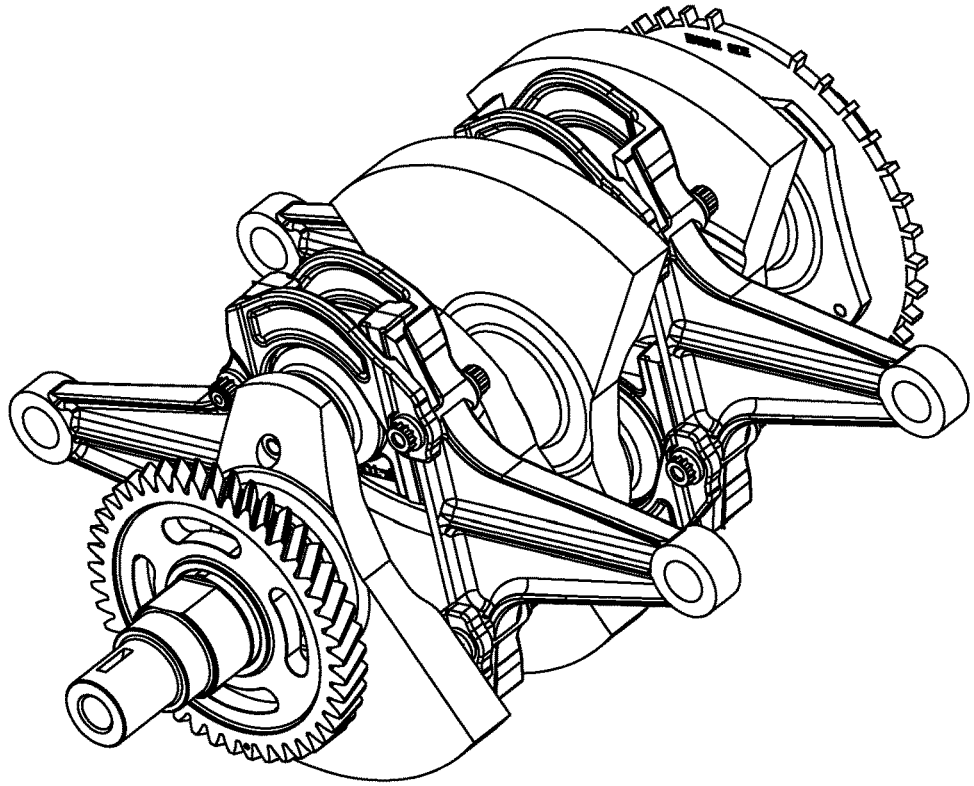
FIGS. 38 and 39 show a crank, slider blocks and conrods assembly in isometric and exploded views.
Figure 37:
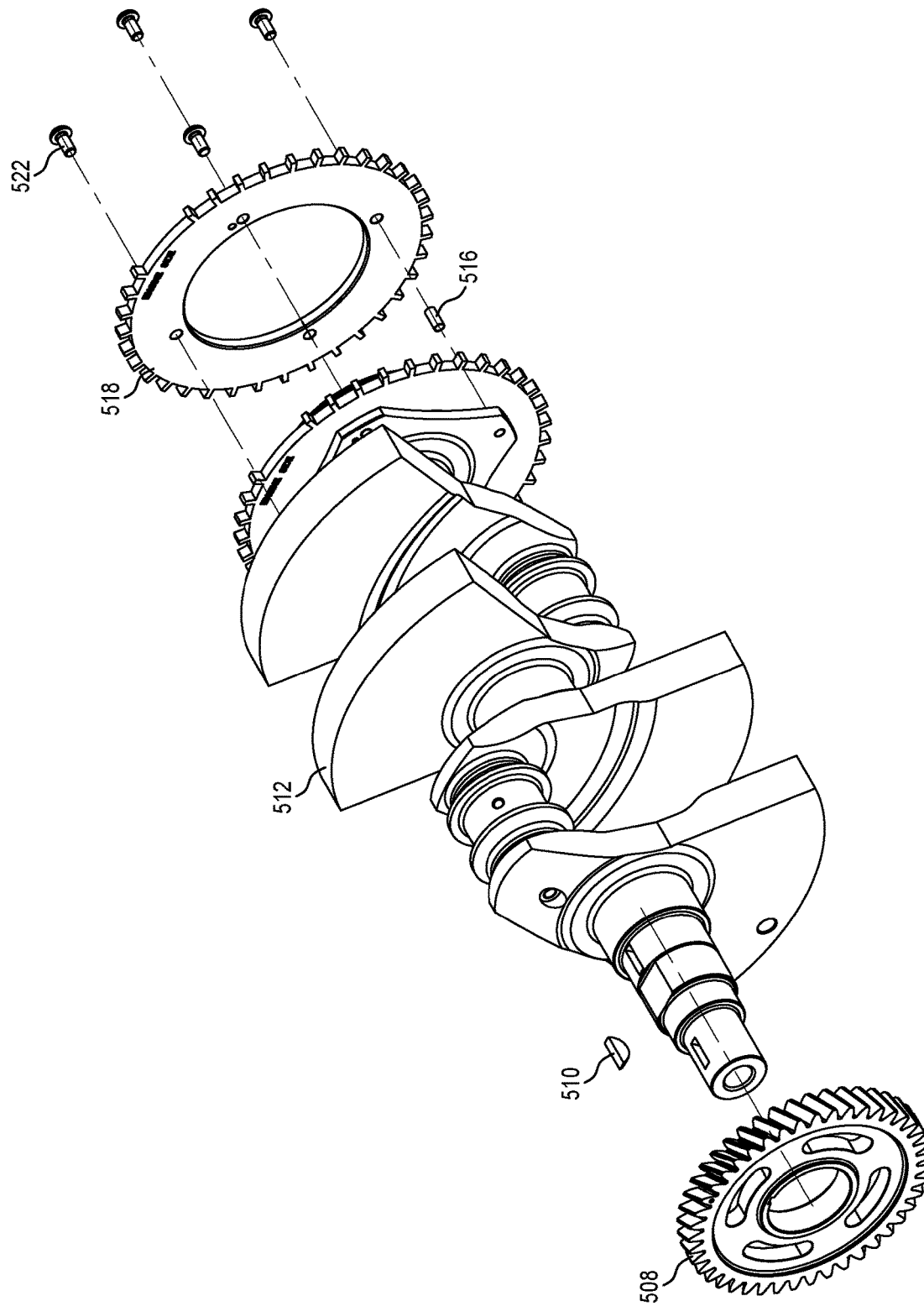
Figure 39:
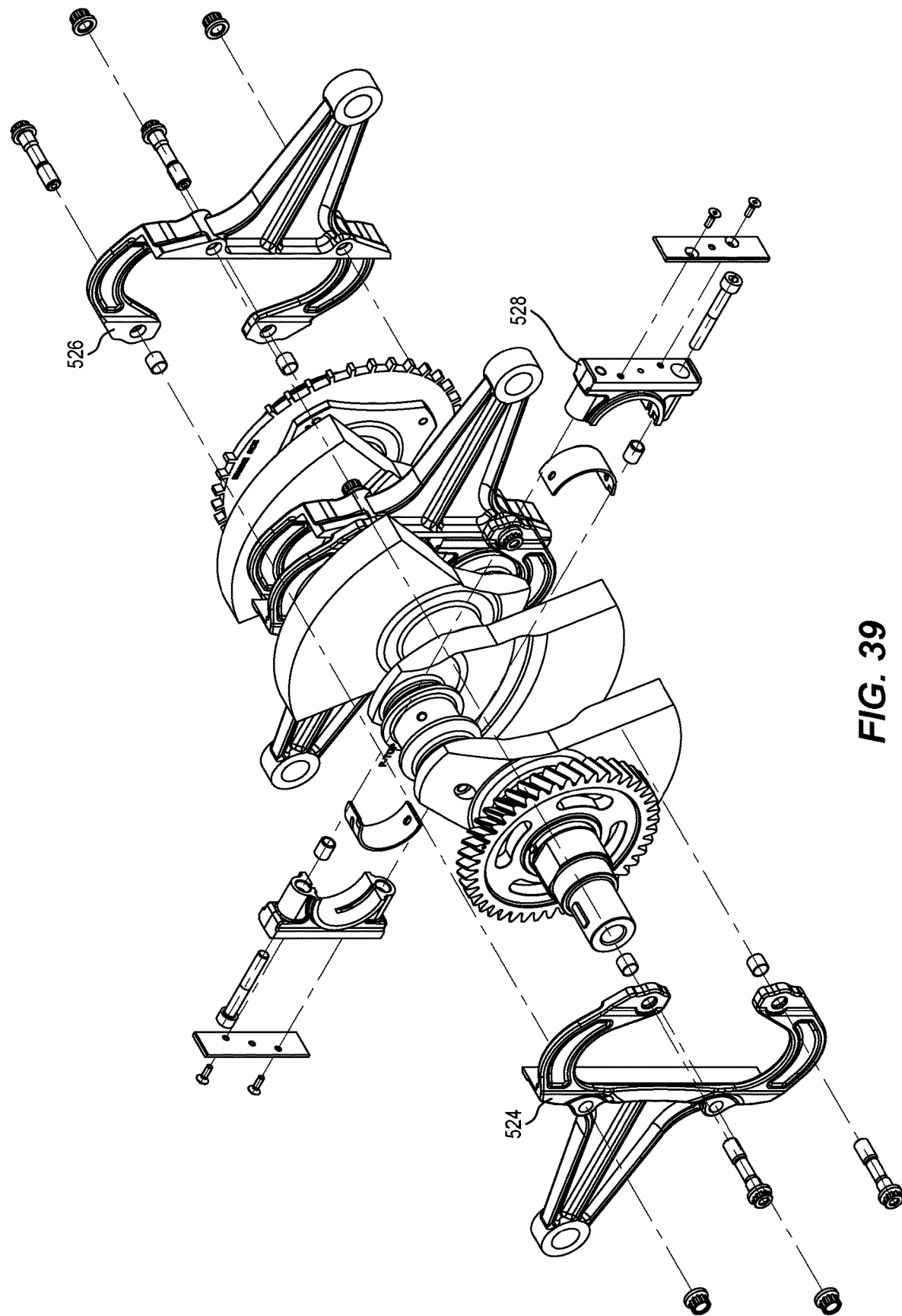

FIG. 27 shows notches in edge of bearing faces (6 shown) to allow oil to leak past the thrust face and out the side of the bearing to lubricate the sides of the bearing and the associated thrust faces. This also applies to the side of the crank flange guide faces.

Concentric Camshaft and Balance Shaft

In many traditional engines, a balance shaft is used to reduce engine vibration. These balance shafts spin at a speed relative to the engine and are driven by the crankshaft. This speed is normally twice engine speed and in the case of a 4 cylinder in-line conventional engine two balance shafts are required. These shafts act to dampen engine vibration by inducing an imbalance opposite to the engine induced vibration, normally known as second order forces.

Figure 18:
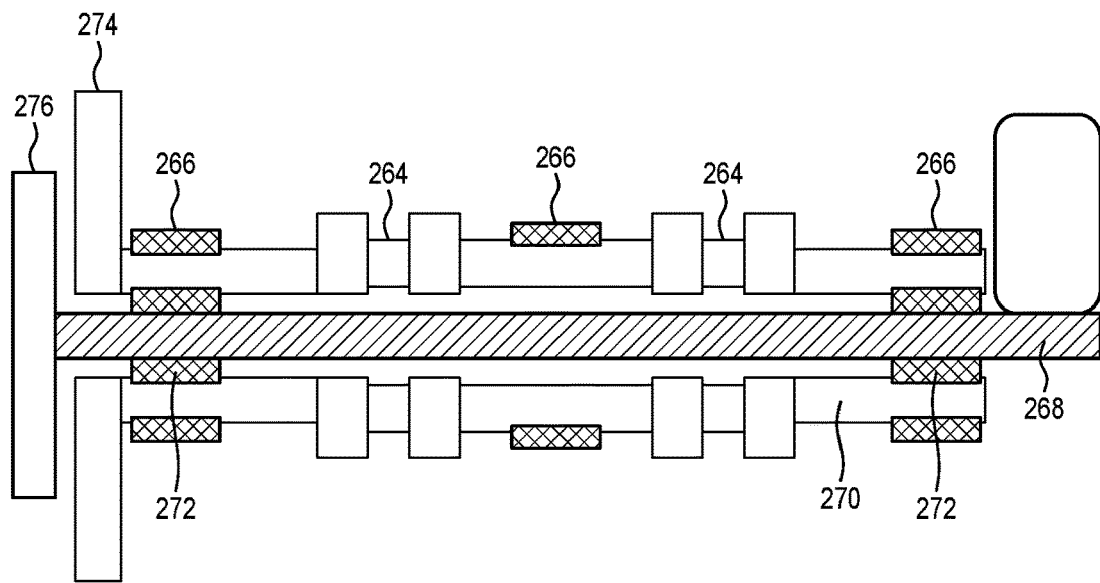
FIG. 18 shows a diagram illustrating a combined concentric camshaft and balance shaft.
Figure 19:
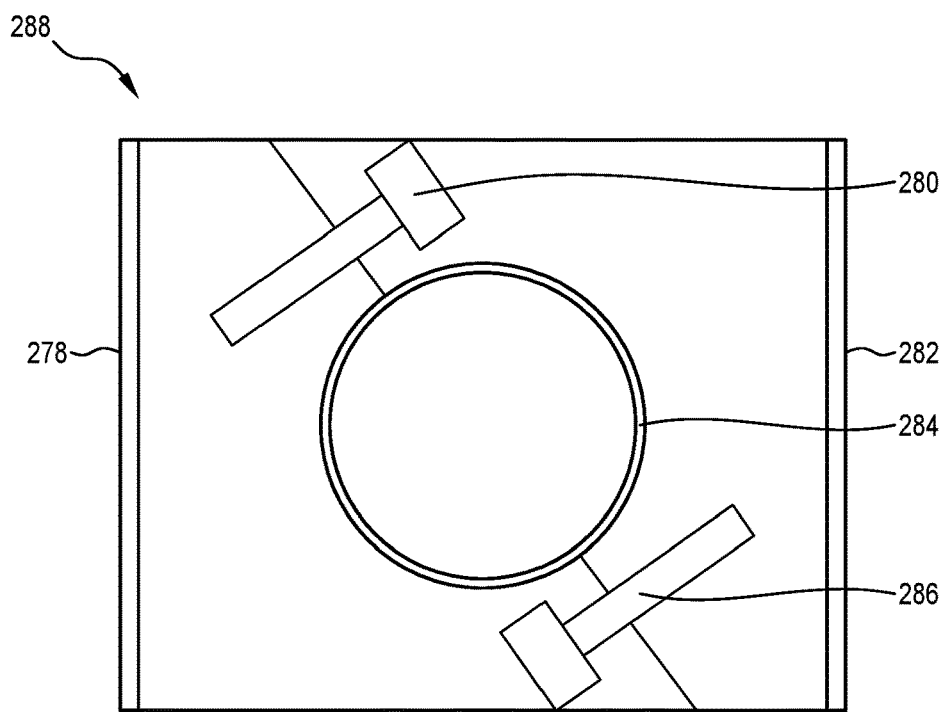
FIGS. 19 to 28 show diagrams pertaining to an angled slider block, an oil pump arrangement, piston sprays and a lubrication circuit.
Figure 20:
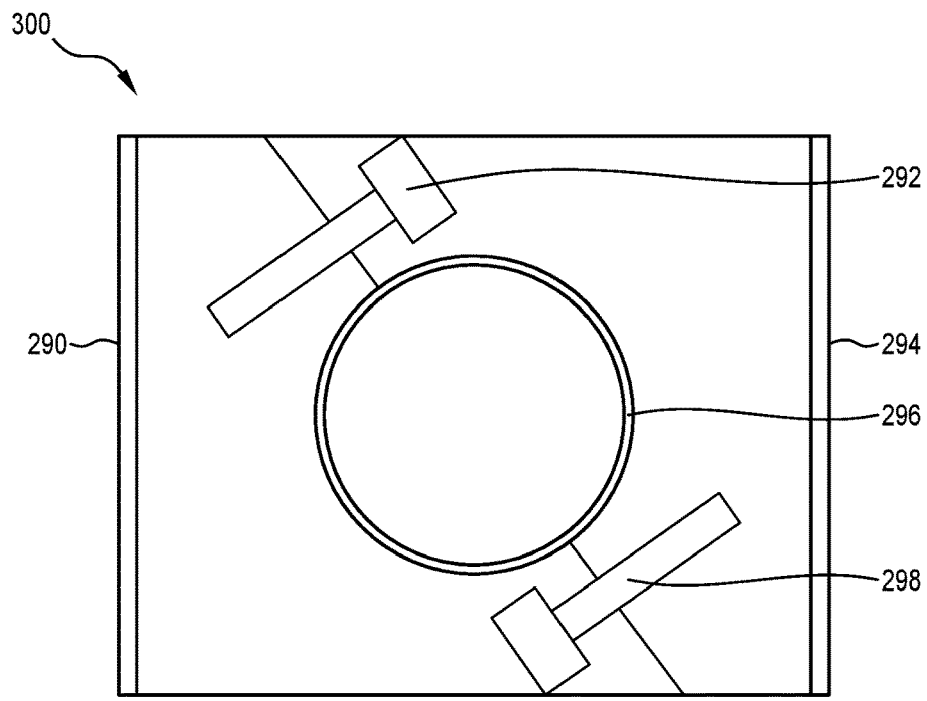
Figure 21:
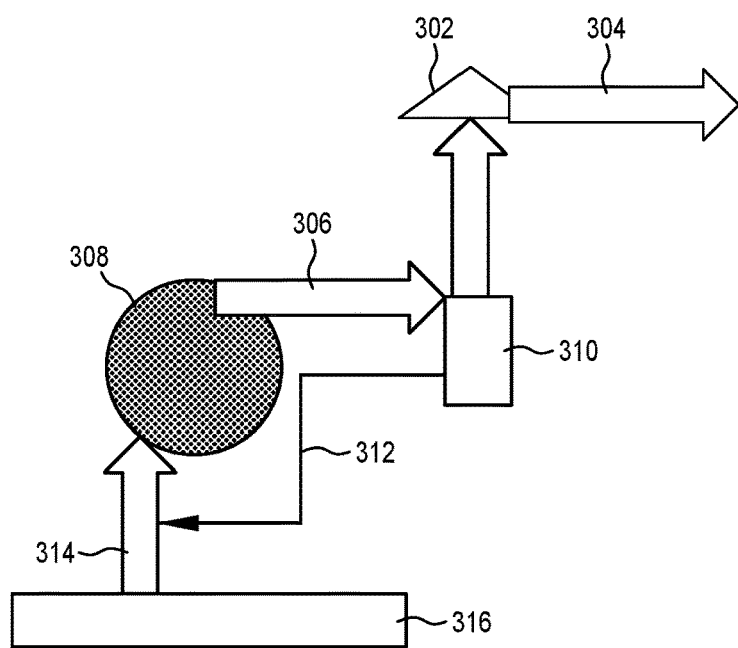
Figure 22:
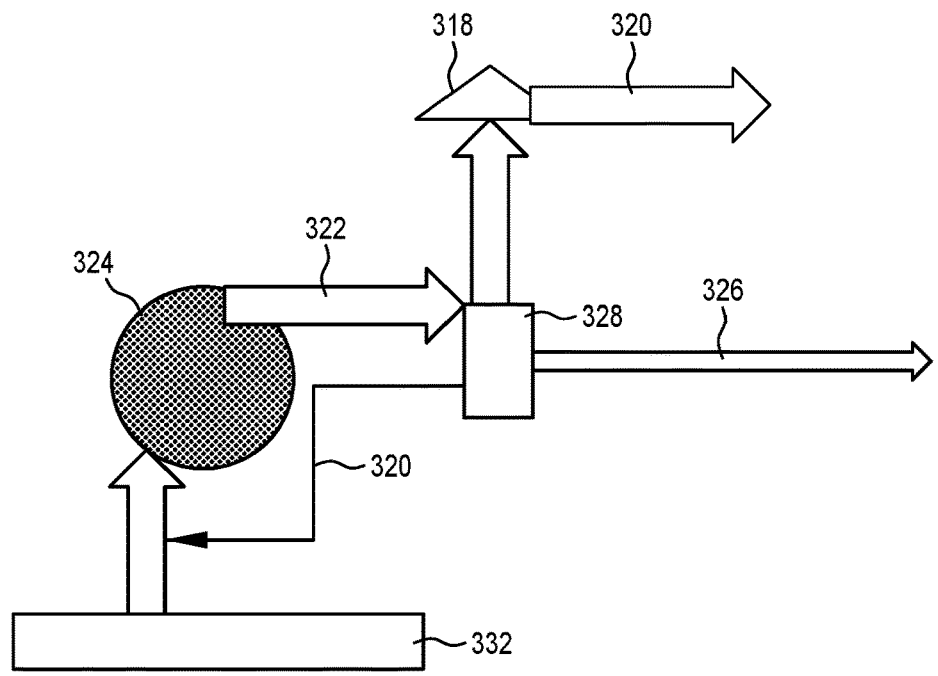
Figure 23:
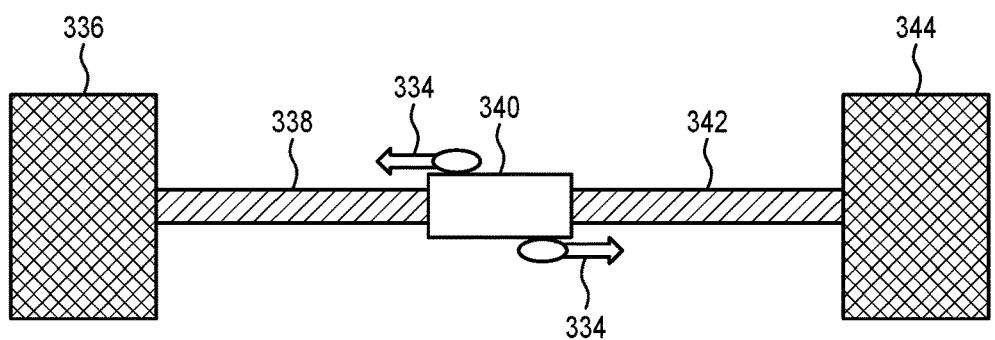
Figure 24:
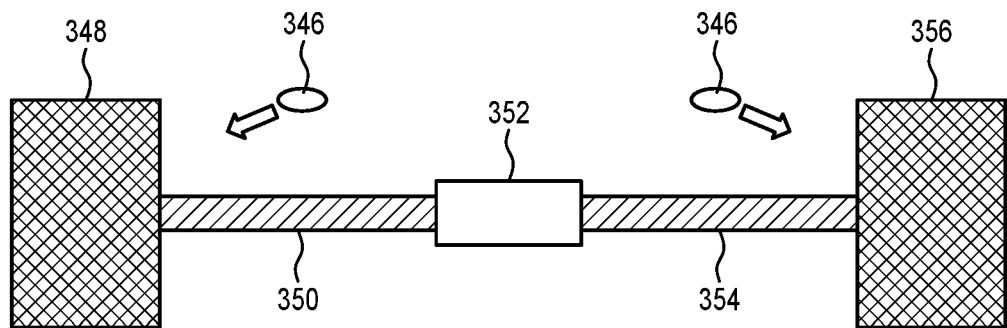

With reference to FIG. 18, by virtue of the Sytech engine design, second order forces are minimal, thus only one balance shaft is required and this spins at engine speed, not twice engine speed. The following invention, outlines a balance shaft that is located inside the camshaft of an engine. For reference purposes, the camshaft spins at half engine speed. This Concentric combined camshaft and balance shaft has many benefits to the engine design including:

A reduction in the rotational inertia of the assembly could be achieved if the camshaft and balance shaft spin in contra-rotation Space requirements are reduced as this invention allows the same positioning of both the camshaft and the balance shaft within the same assembly resulting in optimal packaging The cost of the assembly is reduced as less machining of the cylinder block is required The camshaft and balance shaft can be pre-assembled as a module prior to assembly in the engine In V-type engines the valley between the cylinder heads can be used for location of the combined camshaft/balance shaft resulting in a smaller engine package and re-locating the balance shaft out of the engine sump where normally it could contribute to oil churning and foaming The result is:

Less machining of cylinder block

Lower cost due to the use of lower cost bearings (differential speed of parts is reduced)

A reduced alignment tolerance stack up for the cylinder block resulting in a lower cost, easier to manufacture cylinder block A reduction in friction previously caused by higher bearing speeds of the balance shaft Ease of assembly and lower assembly costs In order to make best use of this invention, the camshaft and balance shaft would spin in the same direction so as to minimise the differential bearing speeds between the parts.

Scotch Yoke Piston Connecting Rod and Crankshaft Guide

With reference to FIGS. 32 to 35, the Sytech engine is an engine that relies on the Scotch Yoke principle of operation in a horizontal, opposed in-line cylinder arrangement. Typically, these engines require very close tolerance of the two opposing cylinders within the cylinder block to ensure alignment and so as not to induce side load of the piston or over-constraint and loading of the slider block on the crankshaft. This results in very tight tolerances and manufacturing cost on the:

Cylinder bores

Cylinder block

Crankshaft positioning

Reciprocating mechanism alignment

Conventional engines must have a rotating joint between the conrod and the piston to allow for the conrod to follow the circular motion of the crankshaft big-end journal. A Sytech engine does not normally need this rotating joint as the pistons and connecting rod move only in a linear direction and hence have no side forces.

In an effort to reduce manufacturing tolerance sensitivity and reduce the need for "matched" cylinder block halves, we wish to include a floating connection between the connecting rod and the piston and transfer the guidance and alignment of the pistons from the cylinder bore to the crankshaft.

This means that:

the slider bearing will be guided on the crankshaft by use of thrust collars

The slider bearing will be guided within the connecting rod by use of a slider bearing and side thrust faces The piston will be free to find its own centre within the cylinder bore without being constrained by a fixed connection between the piston and connecting rod This will allow the piston bores within the cylinder block to be toleranced and aligned in reference to the crankshaft rather than to the opposing cylinder block. The pistons themselves will be free to centre themselves within the cylinder bore via their own minimal, short piston skirt without being held to positional tolerance by the connecting rod. The result is:

Fully floating pistons that operate according to Sytech sinusoidal piston motion Cylinder blocks that can be manufactured separately and not as a matched pair A reduced bore centre tolerance between opposite and adjacent cylinders A reduced alignment tolerance stack up for the cylinder block and corresponding cylinder bores resulting in a lower cost, easier to manufacture cylinder block A reduction in friction previously caused by misalignment Ease of assembly Crank Mechanism Assembly With reference to FIGS. 36 to 39, there is shown an arrangement in which the connecting rods of the internal combustion engine are formed of two like parts, each of the like parts being in the form of an identical C-claw. More specifically, there is shown an internal combustion engine, including a pair of opposed pistons, a pair of opposed cylinders, and an output shaft, wherein each of the pistons is arranged for reciprocating motion within a respective one of the cylinders, driven by combustion, and the pistons are coupled to the output shaft by a coupling such that said reciprocating motion of the pistons drives rotation of the output shaft. The coupling includes a connecting rod coupled to the opposed pistons, the connecting rod being formed from a pair of like parts 524, 526 fastened together, one 526 of the like parts being reversed relative to the other 524 of the like parts prior to fastening.

The connecting rod may have side guides for guiding a slider bearing located for reciprocating movement relative to the connecting rod, and the coupling may further include a crankshaft rotatably mounted within the slider bearing.

Cyclonic Airflow

Figure 40:
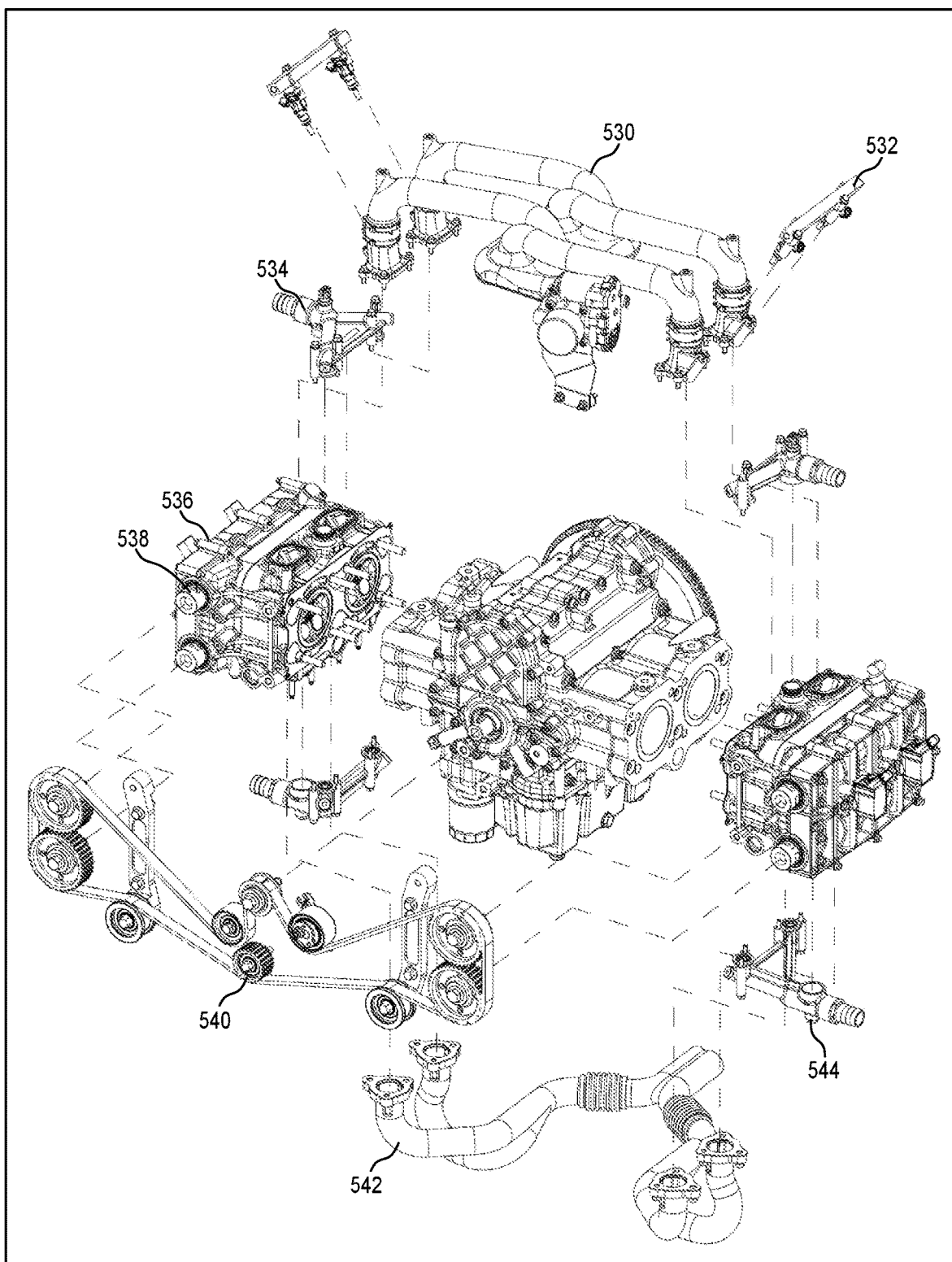
FIG. 40 shows an exploded view of the internal combustion engine including an intake system.
Figure 41:
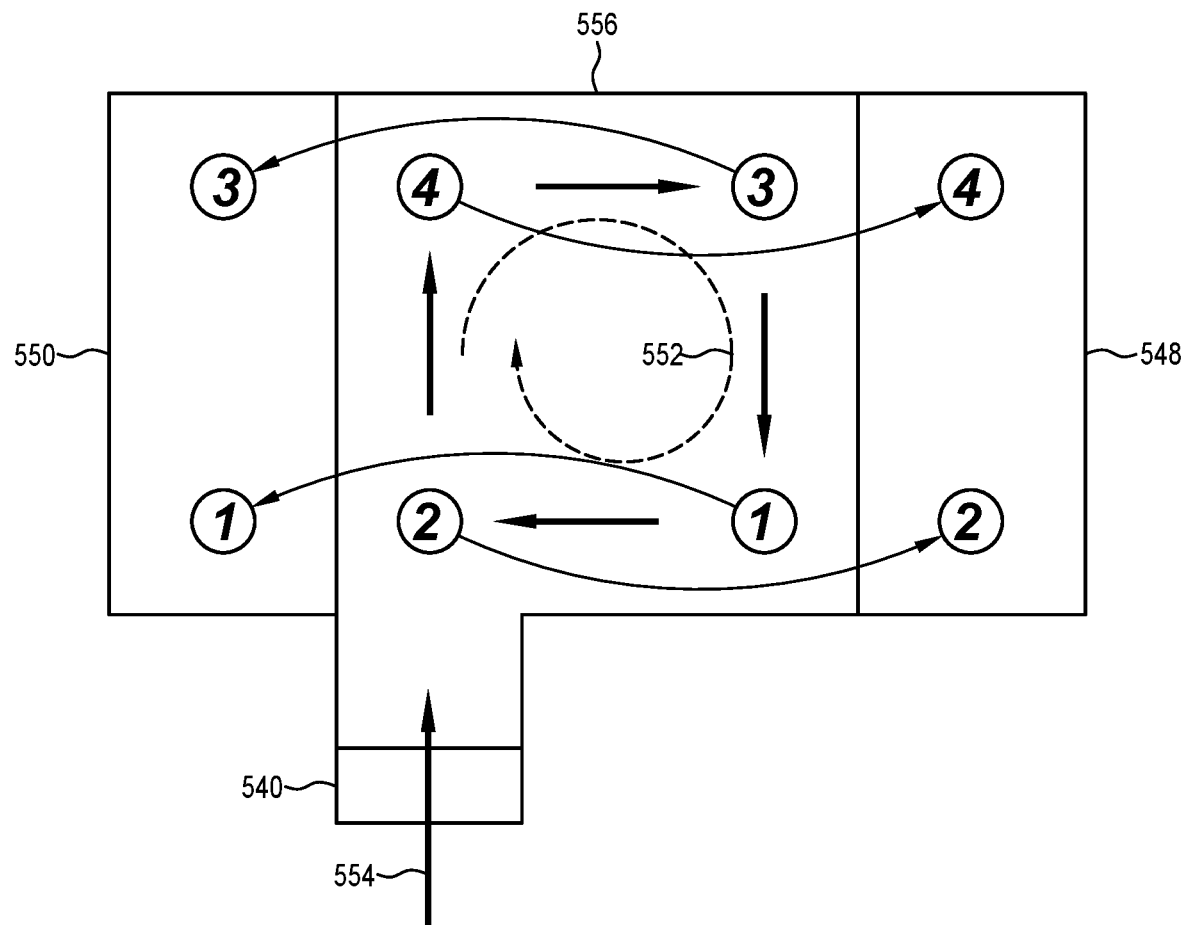
FIG. 41 shows a diagrammatic representation of a cyclonic air flow in a plenum chamber by virtue of the arrangement of the intake system.

With reference to FIGS. 40 and 41, the Sytech engine may have an intake system 530 which promotes a cyclonic airflow in a plenum chamber so as to have an effect similar to a ram charging effect. In particular, there is shown an internal combustion engine, including a pair of opposed pistons, a pair of opposed cylinders, and an output shaft, wherein each of the pistons is arranged for reciprocating motion within a respective one of the cylinders, driven by combustion, and the pistons are coupled to the output shaft by a coupling such that said reciprocating motion of the pistons drives rotation of the output shaft, wherein the coupling includes a connecting rod coupled to the opposed pistons, the connecting rod having side guides for guiding a slider bearing located for reciprocating movement relative to the connecting rod. The coupling further includes a crankshaft rotatably mounted within the slider bearing. The internal combustion engine includes an intake system 530 arranged to induce cyclonic airflow in a plenum chamber of the intake system.

The firing order of the cylinders may be 1-2-4-3. The intake system may be arranged such that intake conduits leading to the cylinders meet at the plenum chamber and are arranged generally in a circular configuration about the plenum chamber in the firing order of the cylinders. The intake conduits from the plenum chamber to the cylinders may be arranged to promote free flow resulting from the cyclonic airflow in the plenum chamber. In one form, the intake conduits may be directed to capture flow from the cyclonic airflow in the plenum chamber. In particular, the intake conduits may lead tangentially from the plenum chamber so as to efficiently capture momentum of the cyclonic airflow. The plenum chamber may be located centrally in relation to the cylinders of the engine and this may be of particular advantage where the engine is a Scotch Yoke type engine as this may facilitate the central placement of the plenum chamber as well as the tuning of the lengths of the intake conduits. In one form, the intake conduits may each be of equal length. By virtue of the cyclonic airflow in combination with the engine being of scotch yoke type, there is greater opportunity to shape the plenum with an optimal shape such as, for example, a rounded and/or circular shape.

The described construction has been advanced merely by way of example and many modifications and variations may be made without departing from the spirit and scope of the invention, which includes every novel feature and combination of features herein disclosed.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge.

BENEFITS ASSOCIATED WITH THE INVENTION

The invention may be used in a wide variety of applications and, in particular, as a low cost and unique solution for modern range extenders.

The inventors have developed a new family of modern opposed piston gasoline engines based on the Scotch Yoke Crankshaft connection principle, called the SYTECH Engine. The engine family consists of modular 2 cylinder units that are joined together to create a family of engines. Due to the engine construction, the engine can be modularized in even numbers of cylinders, i.e, 2 cylinders, 4 cylinders, 8 cylinders etc. With this approach, common engine parts and architecture can be employed to reduce engine cost and weight. This paper focusses primarily on the first engine in the family, a 1.5 litre 4 cylinder engine identified as the 415 engine, where 4 represents the number of cylinders and 15 represents the 1.5 l engine displacement. During the combustion system analysis phase, FEV was responsible for developing an optimized combustion chamber concept with a tailored set of engine geometry parameters which could best leverage the benefits of the Scotch Yoke Principle. In order to do this, 1D engine modelling software (GT-Power) and 3D Computational fluid dynamics software Star CCM+ were used to accurately model the effect of the unique piston motion on the chosen combustion chamber concept respectively. Once this had been performed and the engine combustion modelled, the next step was to determine the necessary technologies and associated costs when using the Scotch Yoke Principle to prepare the engine for future legislative and customer requirements. This paper provides a brief overview of ASFT's new engine family with a focus on the detailed results of the combustion system analysis and engine recommendations leading to the prototype build phase and the upcoming engine testing.

1. INTRODUCTION TO THE NEW FAMILY OF MODERN SYTECH ENGINES

The background of the new engine family is the development of a common core engine structure in the crankshaft and piston connection that can be applied to multiple engine configurations. This enables the engine to be built to suit a wide range of power outputs with maximum commonality while protecting for the application of additional technologies in the future. The benefits of this strategy are that it allows a wide range of engine variants that achieve legislative compliance whilst using as many common parts as possible with the required technology package.

Figure 5:
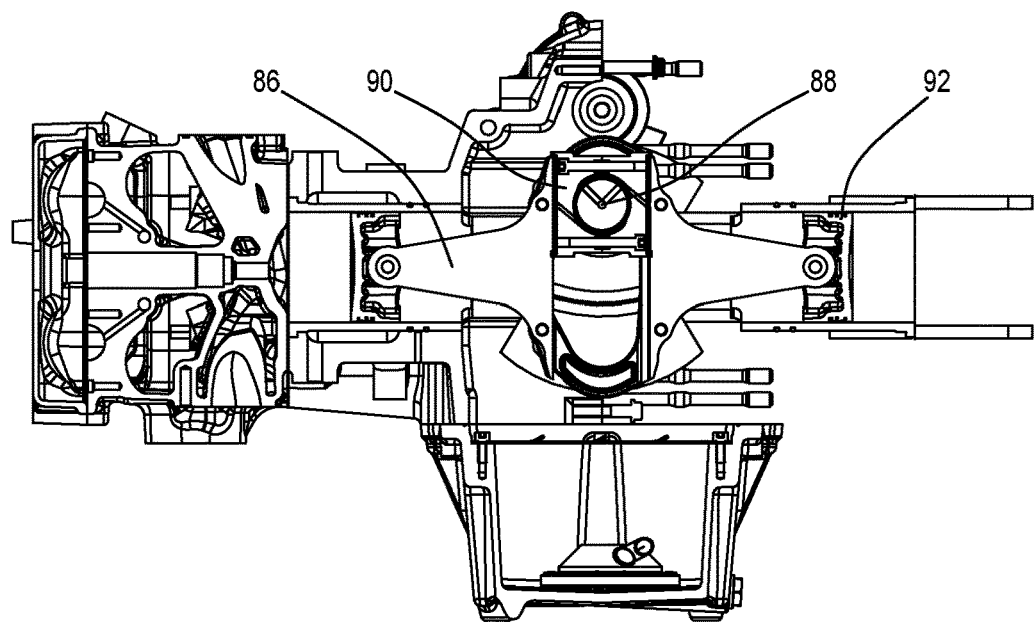

In order to determine the best architecture for the engine, we first modelled the engine construction. The SYTECH engine piston motion is uniquely different to traditional crank/connecting rod engines. Due to the connecting rod arrangement, the SYTECH piston travels in a uniform way following a pure sinusoidal motion. FIG. 5 shows the SYTECH connecting rod arrangement with the slider block.

A conventional engine has a piston motion that is quite short/sharp at the top of the stroke during combustion, this is a function of the relationship between the connecting rod and crank throw length. The SYTECH mechanism results in a pure sinusoidal piston motion regardless of the connecting rod length as depicted in FIGS. 2 and 3.

Although this difference appears to be minor, the net effect is that the combustion process has more time to complete in the end of the compression stroke. In theory this results in more time to burn the fuel, a more uniform piston motion, more uniform piston pressures/forces, less firing force peaks and lower emissions.

The next advantage of the SYTECH piston arrangement is that two opposing pistons share the same crankshaft journal. This makes the engine much shorter than conventional engines and traditional boxer engines. When comparing bore spacing alone and ignoring front and rear engine accessories, a 4 cylinder SYTECH engine can be up to 50% shorter than a traditional In-line 4 cylinder engine. When comparing a 4 cylinder SYTECH opposed piston engine to a 4 cylinder boxer engine, the SYTECH engine is up to 33% shorter. This makes the SYTECH engine very easy to package in most engine bays and offers advantages when packaging the engine in other areas of the vehicle like behind the rear seats, under the vehicle etc.

Figure 6:
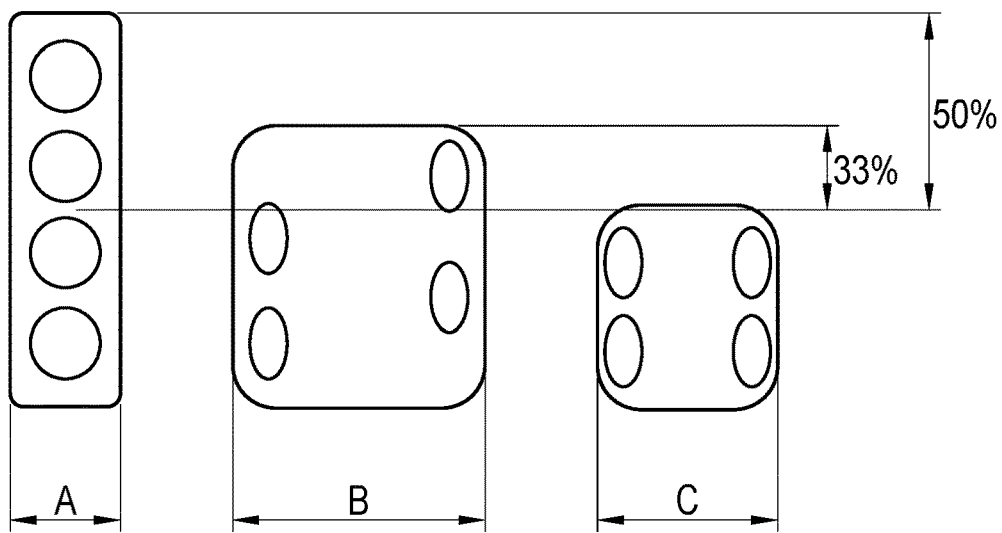

FIG. 6 shows an engine length comparison of A (inline 4), B (Boxer 4) and C (Sytech 4).

Figure 7:
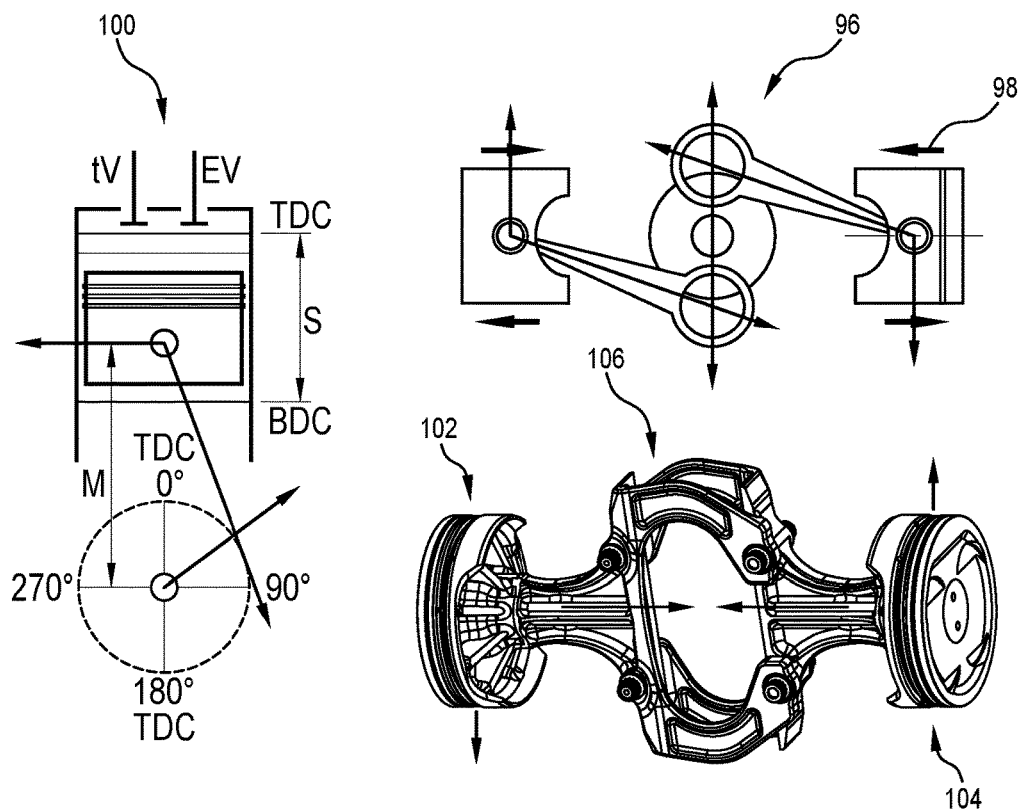
Figures 8A, 8B:
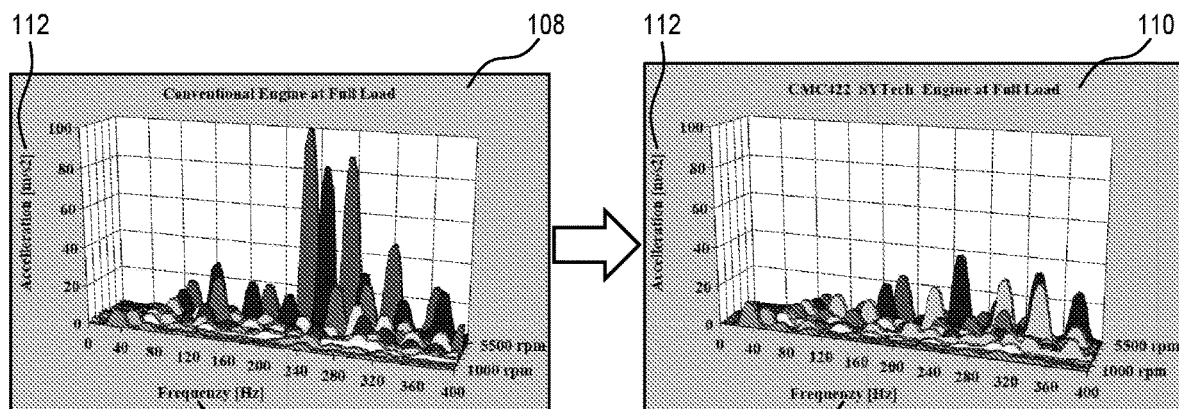
Figure 8C:
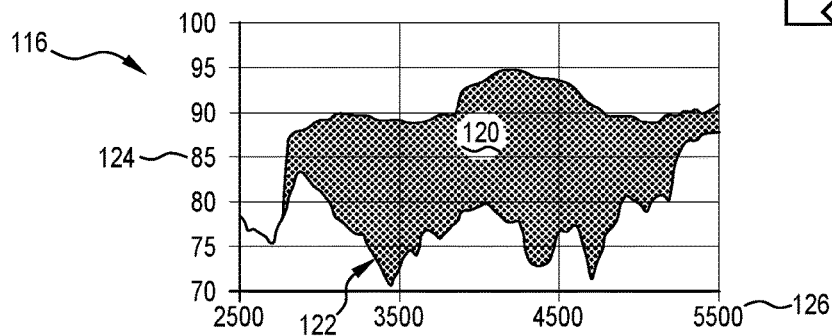

The third advantage of the engine is that due to Scotch yoke mechanism and slider block arrangement, there are almost no out of balance forces and very low piston side forces. This results in a well-balanced engine that is quiet. FIG. 7, out-of-balance force comparison, shows the SYTECH engine out of balance forces when compared to other engines. FIG. 8, NVH test results, shows the results of testing conducted on early prototypes of the engine developed several years ago. The NVH advantages are highly evident in these results and this is key for Range Extender Vehicles which are primarily a Battery Electric Vehicle with an on-board generator. The generator needs to be quiet and vibration free so as to be as unobtrusive as possible and not negatively impact on the comfort of the vehicle operator when it is running.

The advantages of the SYTECH engine make it an attractive solution for the Range Extender market, so we decided that we would like to build some engines for testing, but only if the engine was able to meet the Performance and Emission targets, especially those of the China market and China 6b emissions.

The first step in designing an engine is to set targets for the engine performance and to then model the engine, specifically in SYTECH's case, model the engine using the SYTECH piston motion along with the resulting combustion in order to optimize the bore, stroke, compression ratio, valve sizes, valve overlap, valve timing and injector requirements to meet the target performance and emission levels.

Initial target parameters were set for the engine design and analysis based on a 1.5 L low cost, minimum technology package engine.

The key design parameters were;
An emission output that meets China 6b
RON 92 Fuel
A Normally Aspirated power rating of 60 kW at 4500 1/min
Best In Class Fuel Economy The design process to be followed was aimed at coming up with a combustion system concept that enabled us to have a family of engines that are based on the same core internal design where all the engines in the family would share the same bore, stroke, compression ratio, crank bearing diameter, connecting rod, piston, slider block, valve sizes/angles and be modular. The outputs would then be expected to be something similar to that shown in the table of FIG. 9, "Engine family". This table shows variation in parameters, engine displacement and engine power estimate according to 2 cylinder, 4 cylinder and 8 cylinder versions of the engine.

As a result, if successful, the three engine variants would share;
the same cylinder bore
the same combustion chamber
the same valve sizes
the same injector arrangement
the same piston
the same connecting rod
the same timing drive
the same slider block and many of the other base engine components. This decreases production complexity, increases common part volumes, improves reliability, decreases manufacturing/tooling and decreases overall engine cost.

2 SYTECH COMBUSTION SYSTEM ANALYSIS

Conventional 4 cylinder engines have a firing order that is 1-3-4-2; in contrast, the SYTECH opposed piston engine has a firing order that is 1-2-4-3. This change in firing order is not so important when modelling the individual combustion chamber performance but is critical when modelling the Inlet manifold, the plenum chamber and the exhaust system in order to determine the lengths and tuning of these inlet and exhaust systems to optimize the final engine performance.

Figures 9, 10, 11:
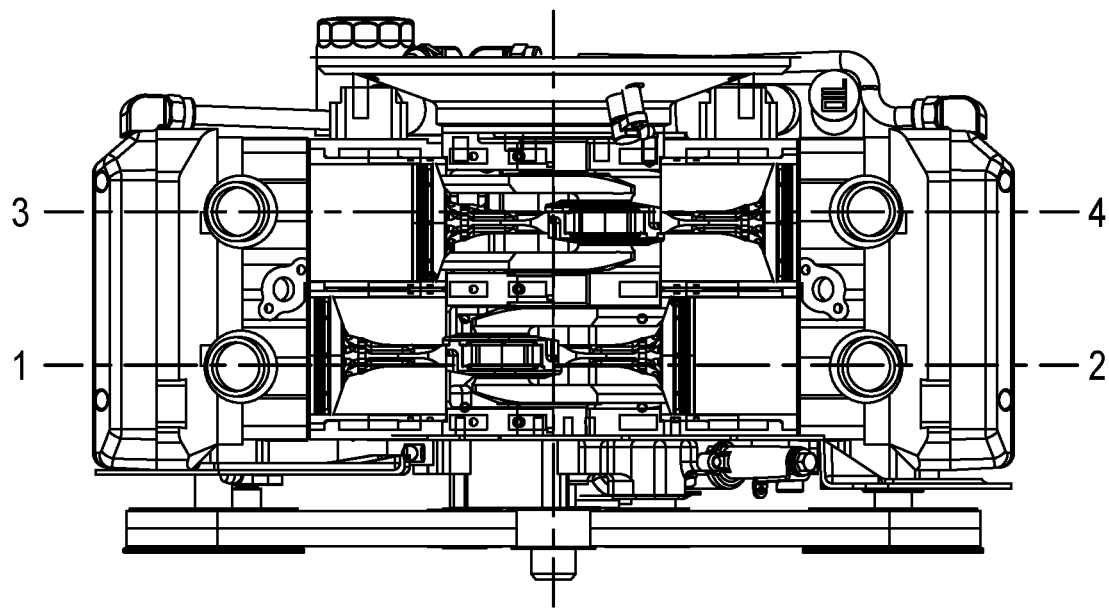

FIG. 10 shows that the firing order of the SYTECH engine is 1-2-4-3.

3 COMBUSTION ASSESSMENT VIA FEV'S CHARGE MOTION DESIGN PROCESS

The concept and layout phase of the new engine family was supported by FEV's charge motion design CFD process. This process analyses and compares the geometries of the air guiding surfaces in the cylinder head and the combustion chamber to predict an optimal combination of engine parameters to achieve the design targets. It also considers the interaction between the in-cylinder flow field and the fuel injection for improved and optimized fuel homogenization.

The concept study model was used to determine the optimum bore and stroke for the SYTECH engine. After several early runs in the model, the optimum bore and stroke was determined to be 85 mm stroke and 75 mm bore, this gave us a 1.5 L 4 cylinder engine. Using a data driven approach, sufficient iterations of the model were then performed, modified and repeated to determine the optimum arrangement of the combustion chamber.

After these modelling iterations, the engine architecture that was decided on moving forward was;

A 4 valve combustion chamber, 2 inlet and 2 exhaust without camshaft phasers
A centrally placed spark plug
Port Fuel Injection (not DI)
A flat piston
11.0:1 compression Further modelling iterations and analysis of the engine yielded valve sizes and angles that were the best match to the piston motion of the SYTECH Engine and were good inputs for the next stage of the engine modelling. Finally, the proposed parameters for the engine were as shown in the table of FIG. 11. The names of the proposed parameters according to the reference numerals are explained in the Features List which follows at the end of the detailed description section of this specification.

Following the selection of the proposed parameters, several iterations were run using a detailed CFD modelling approach to assess and optimize the flow guiding surfaces in the combustion system. After these analyses, the present applicant settled on an iteration showing a good compromise between charge motion and flow restriction.

Figure 12:
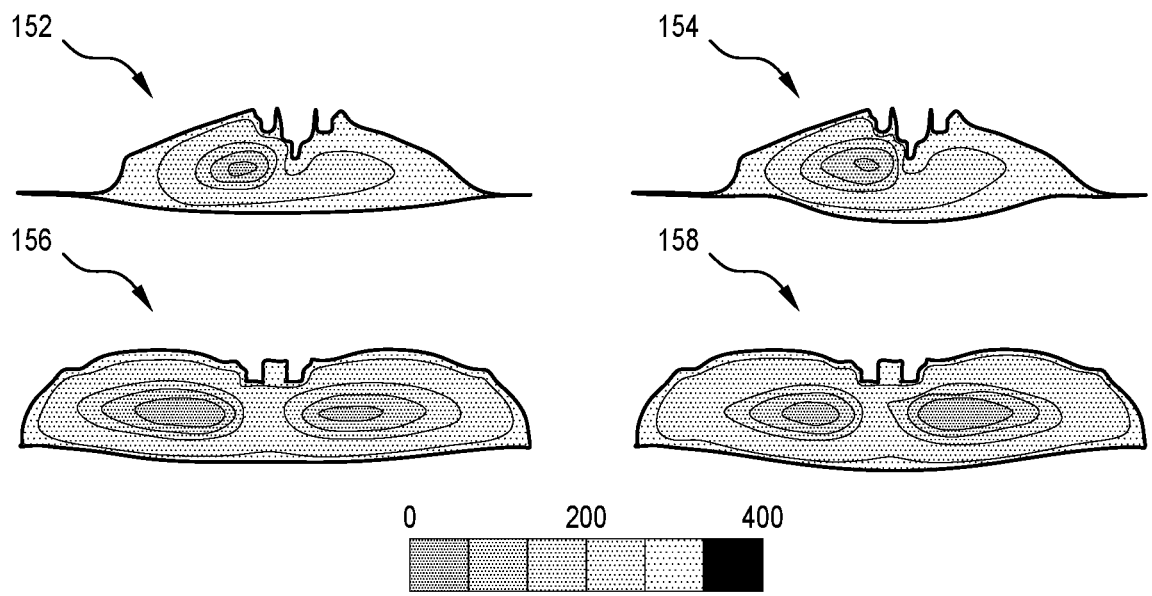

FIG. 4 shows stationary port flow simulation results and FIG. 12 shows charge centering close to the centrally located spark plug. FIGS. 4 and 12 show two important illustrations of the charge motion design process. FIG. 4 depicts the simulated intake flow field in the middle of the intake stroke in the valve cut-section of cylinder #1. It can be seen that the applied high charge motion tumble intake port generates a strong jet of air flow entering the combustion chamber. Within the combustion chamber, this jet is guided by the exhaust side of the combustion chamber roof to transit into a tumble motion. The flat geometry of the piston crown ensures low disturbances during intake and early compression stroke. This enables a good conservation of the tumble flow motion until the late phase of the compression cycle resulting in a good centering of the charge around the centrally located spark plug as can be seen in FIG. 12.

All the modelling performed on the engine was with RON 92 fuel. It was decided that this was an important consideration for a range extender engine that would need to be flexible and be able to be fueled in even the most remote of locations.

Figure 13:
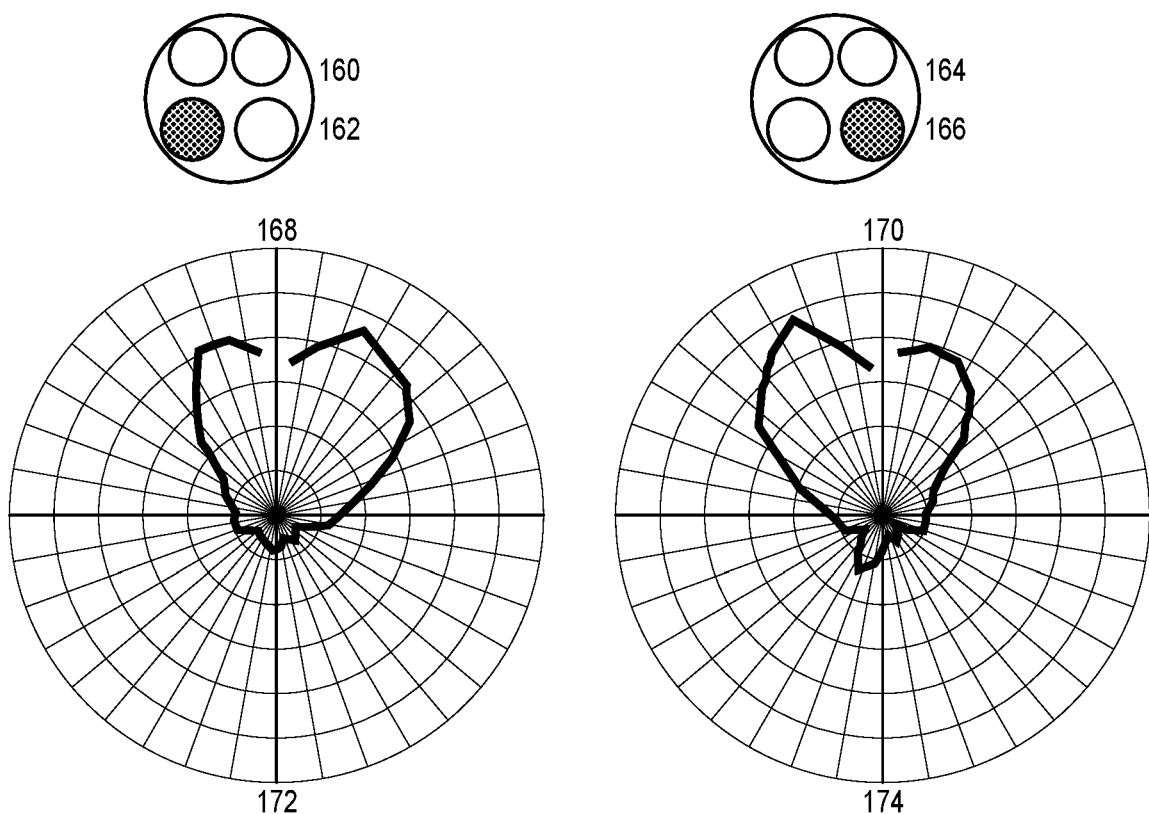

FIG. 13 shows mass flow distribution over the two inlet valves.

Figure 14:
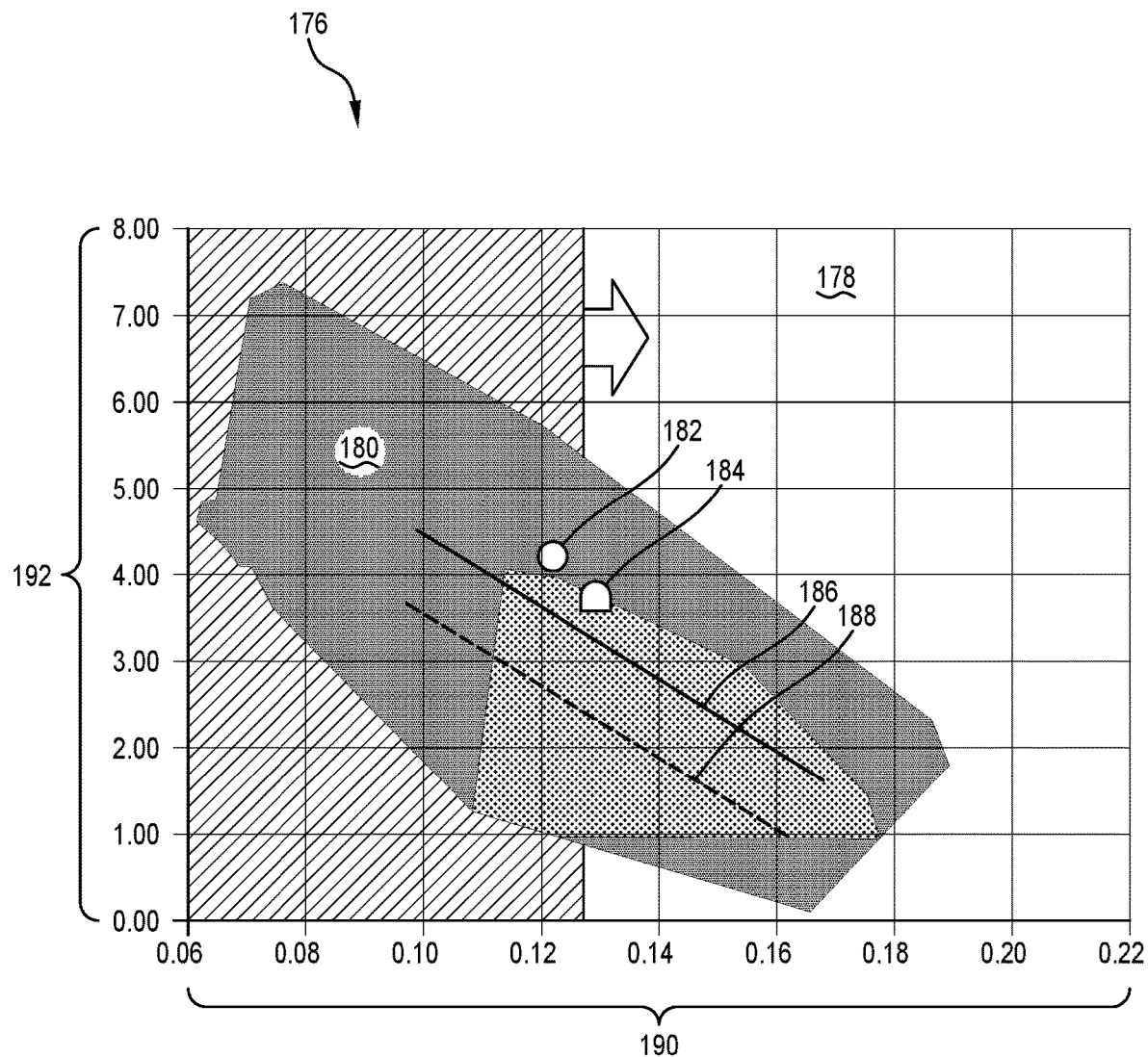

When comparing the results of the engine analysis it is found that the chosen model iteration is located above the performance line of 30 other similar engines that were included in the FEV scatterband as shown in FIG. 14 (Evaluation of Charge motion vs engine scatterband). This proves a best-in-class trade-off between the flow performance is necessary to achieve the rated power and the charge motion resp. tumble to achieve high efficiency in the entire engine map.

The table in FIG. 15 (Engine design attributes) shows a summary of the resulting technologies that were necessary to achieve the engine parameters that have been set for the engine performance. It can be seen that the core of the proposed SYTECH engine family includes low cost, readily available technology features of common engines, such as fixed intake and exhaust camshaft timing (which is well suited for non-transient REX applications), Port fuel injection and combined Catalytic converter with GPF. As a result, this engine should be a low cost engine with maximum reliability.

Although the engine architecture sounds relatively simple, according to the modelling it is still able to achieve all of the design parameters set for the REX application. In addition, during the design and analysis stage, it was possible to incorporate space for a DI Injector and to design the combustion chamber such as to protect for the future use of a Turbocharger with a common cylinder head base design. For any future boosted application, the ports will have to be optimized for the TC application and machining for DI injector must also be considered but the important note is that the cylinder head has been designed with these options in mind. When we add these features to the engines inherent size, shape, weight and vibration advantages, the applicant has a good solution for range extender vehicles, particularly those requiring higher power outputs.

With relatively basic (common, state of the art) technology, we were able to achieve an engine that was light weight, cost effective, low risk and with the ability to be fitted with a DI injector and/or turbo-charged at a later date with minimal changes.

Figures 16, 17:
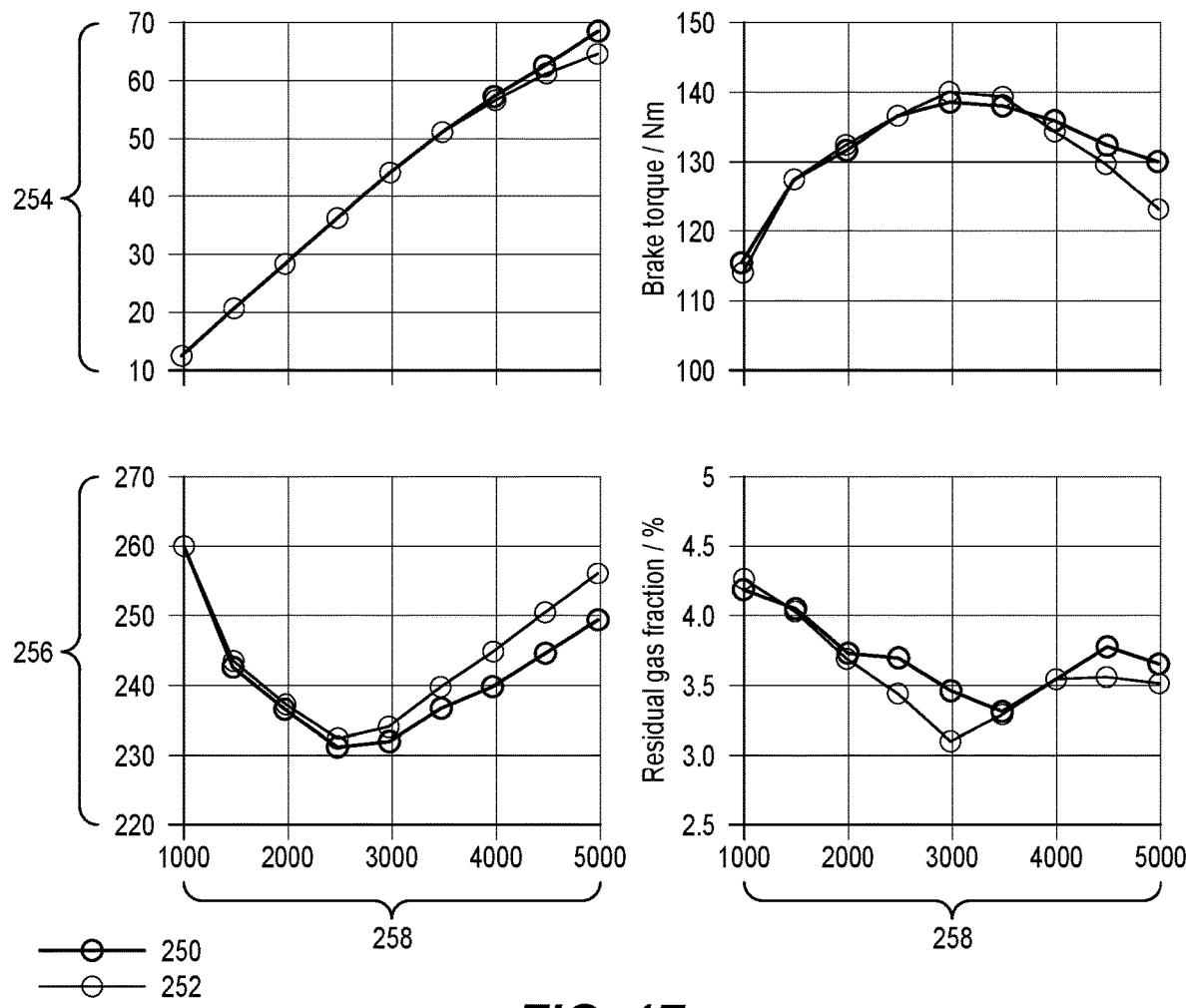

The table in FIG. 16 shows performance vales of the 1.5 litre SYTECH engine and FIG. 17 shows engine performance. FIGS. 16 and 17 show the modelled performance results of ASFT's new 1.5 engine with 62 kW peak power at 4500 RPM. As mentioned earlier, the engine is designed to provide a high power output, Normally Aspirated even with RON 92 fuel. This target is represented by the peak torque of 140 Nm at 3000 rpm engine speed.

In order to realize this development, FEV and ASFT applied advanced engineering methods to ensure a fast, stable and efficient combustion, while maintaining low friction, good NVH and a lightweight design.

4 ENGINE BASE DESIGN

The base design of ASFT's new 1.5 l engine needs to be capable of withstanding the forces and loads generated by combustion whilst being reliable, light-weight, low cost and low friction. Friction is a major consideration when designing an efficient engine. As the SYTECH piston-to-crank connection is unique, during the FEV analysis and modelling we had to assume a friction level that was based on previous SYTECH engines. The SYTECH engine should have a lower friction level overall as it has only 3 main bearings and two connecting Rod bearings for a 4 cylinder engine, as opposed to 5 main bearings and 4 connecting rod bearings as is the case for most conventional inline 4 cylinder engines. The SYTECH engine does have an additional slider bearing but the slider bearing causes the piston to have almost no side forces so the overall piston friction is lower. The focus of engine development after the prototypes are built will be to tune the engine for emissions and power, correlate the analysis models and analyse the overall engine friction which will increase our efficiency and reduce our losses. Small bearing diameters and a light-weight piston group with a low pre-tension ring pack help to reduce the friction in the crank train and have already been included in the engine design.

For the timing drive, a belt has been chosen to combine the benefits of excellent robustness and a state-of-the-art NVH behavior and good serviceability. At the same time, the layout of the complete timing drive has been optimized in close cooperation with the belt drive system supplier to achieve a very low friction level and minimize belt harmonics and whipping.

The valve train uses roller finger followers (RFF) and hydraulic lash adjusters (HLA) for low friction and maintenance free operation. The valve spring design was analyzed and optimized in detail with kinematic and dynamic valve train simulations to ensure safe operation in the complete speed range. The balance shaft on the SYTECH engine runs at engine speed and this is directly chain driven off the crankshaft. The oil pump is located around the crankshaft so that no drive related friction losses need be considered.

5 COMBUSTION DEVELOPMENT

Several engines have been built and these are currently being prepared, instrumented and readied for testing at FEV's test facilities to verify the concept, layout and design steps. The engine will be instrumented with water-cooled in-cylinder pressure transducers at all cylinders, exhaust and intake pressure indication at cylinder #1, comprehensive exhaust gas analysis and thermocouples as well as pressure sensors at all relevant positions on the engine.

The combustion models used in the concept design study will be used for validation purposes and help further identify any areas for combustion system optimization following the first round of Thermodynamic testing.

6 SUMMARY AND CONCLUSION

ASFT Technologies Australia (ASFT) and FEV successfully cooperated in the development of a new family of modern SYTECH gasoline engines. The lead engine of this cooperative development is ASFT's new 1.5 litre opposed piston engine, which is designed for outstanding performance and good fuel efficiency at a low cost using RON 92 fuel.

In order to achieve the targeted performance with RON 92 fuel, FEV and ASFT focused on the development of a modern SYTECH engine with stable combustion.

- FEV's charge motion design process was successfully applied to establish a high charge motion level, good flow conservation until late compression and optimized turbulence localization at end of the compression
- The base engine was optimized to withstand the loads and forces of combustion, while achieving a low weight, compact design and low overall friction
- The results from the modelling indicate that the SYTECH engine should be a low cost solution, able to achieve China 6b with minimal required technology.
- The SYTECH engine approach results in a modular engine that can be repeated in pairs of cylinders to achieve a family of engines that share the same core design and components minimizing cost and infrastructure.

ASFT's new engine family does not only provide outstanding performance with minimal technology, but it has also been protected for the application of more sophisticated future technologies such as cooled EGR, Direct Injection and Turbocharging.

Therefore, the new 1.5 l SYTECH engine according to an example of the invention is a Low Cost Unique solution for Modern Range Extenders.

FEATURES LIST

10 Internal combustion engine
12 Cylinder
14 Piston
16 Output shaft
18 Line of present engine (FIG. 2)
20 Line of conventional engine (FIG. 2)
22 Line of present engine (FIG. 3)
24 Line of conventional engine (FIG. 3)
26 Top Dead Centre
28 Bottom Dead Centre
30 Combustion chamber
32 Valves
34 Both the present invention example "SYTech" and conventional engines have identical Stroke and Bore
36 Conventional
38 SYTech
40 Before Top Dead Centre (TDC)
42 After Top Dead Centre (TDC)
44 Piston Velocity, mm/degree
46 Crank angle, degree
48 Clearance Volume (CV)
50 Cylinder Volume
52 Swept Volume (Cylinder Capacity)
54 Total Working Unit Cylinder Volume
56 Crank (degrees before TDC)
58 Crank angle, degree
60 % Combustion Chamber Velocity Difference (Conventional>SYTech), ((Conv.−SY)/CV)*100
62 Conventional
64 Sinusoidal (SYTech)
66 % Cony.>SY, ((Cony.−SY)/SY)*100
68 Crank (degrees after TDC)
70 % Volume Difference
72 Sytech vs Conventional
74 Arbitrary Section horizontal
76 Arbitrary Section vertical
78 Preview
80 Section Valve 1
82 Section Valve 2
84 Preview
86 Connecting Rod
88 Crankshaft
90 Slider Block
92 Piston
94 Conventional Engine
96 Boxer Engine
98 Many Imbalance Forces
100 Many Imbalance Forces
102 SYTech Flat Boxer Engine
104 Almost Nil Imbalance Forces
106 Smooth and Quiet Operation with Perfect Balance
108 Conventional Engine at Full Load
110 STTech Engine at Full Load
112 Acceleration (metres per second per second)
114 Frequency (Hz)
116 Operation Noise Comparison: SYTech Engine 75-80 db vs Conventional Engine 90-95 db
118 Wide Open Throttle Cabin Noise, $2^{nd}$ Gear
120 Conventional Engine (4 Cylinder)
122 SYTech (4 Cylinder)
124 Noise Level in db(A)
126 Engine Speed in RPM
128 Parameter
130 No. of Cylinders
132 Engine Displacement
134 Power Estimate
136 Stroke
138 Bore
140 Int. Angle 142 Int. Diameter
144 Exh. Angle
146 Exh. Diameter
148 Dv/D
150 CR
152 Sierra FEV-3
154 Sierra FEV-4
156 TKE/m^2/s^2
158 CA=720 degrees after TDC
160 Outlet
162 Inlet
164 Outlet
166 Inlet
168 Massflow distribution intake-valve-2/[kg/h]
170 Massflow distribution intake-valve-1/[kg/h]
172 Port flow coefficient
174 alpha K=12.8%
176 Evaluation of Charge Motion Generation
178 Required filling performance (rated power)
180 CMD trend line for IV angle 21 degrees, S/D 1.14
182 Sierra FEV-2
184 Sierra FEV-4
186 Scatter NA
188 CMD trend line for IV angle 16 degrees, S/D 0.9, D 0.56
190 Flow coefficient (alpha K)/1
192 First tumble peak/1
194 Engine technologies
196 Aluminium crankcase
198 Forged steel crankshaft
200 Targeted lubrication
202 NVH optimised base-engine
204 NVH and friction optimised synchronous belt
206 Low friction roller finger follower valve train with maintenance free automatic hydraulic lash adjustment
208 Fixed intake and exhaust timing
210 High charge motion tumble port
212 Port fuel injection
214 Close coupled catalyst incl. GPF
216 Electric Water Pump
218 Optimised low friction piston rings
220 Balancer shaft (1$^{st}$ order)
222 Technology Protections
224 Protection for external HP EGR
226 Protection for Turbo-charging
228 Protection for ISG
230 Protection for Direct Injection
232 SYTech
234 Performance Values of ASFT's 1.5 Litre engine
236 Rated power @ 4500 rpm
238 Low end torque @ 1500 rpm
240 Specific power output
242 Minimum BSFC @ 3020 rpm and 11.65 BMEP
244 Emission level
246 Nominal fuel
248 Performance
250 New DoE
252 Old DoE
254 Brake power/kW
256 BSFC/g/kW-h
258 Engine speed/rpm
260 Residual gas fraction/%
262 Brake torque/Nm
264 Cam lobes
266 Camshaft bearings
268 Balance shaft
270 Camshaft
272 Balance shaft bearings (between camshaft and balance shaft)
274 Camshaft drive sprocket
276 Balance shaft drive sprocket
278 Slider bearing
280 Bolt
282 Slider bearing
284 Crankshaft bearing
286 Bolt
288 Angled slider block with in-interrupted slider bearing faces using separate slider bearings
290 Slider bearing material deposited onto slider block
292 Bolt
294 Slider bearing material deposited onto slider block
296 Crankshaft bearing
298 Bolt
300 Angled slider block with un-interrupted slider bearing faces using direct deposited bearing material onto slider faces
302 Oil filter
304 Filtered oil being sent to engine bearings etc.
306 Pressurised oil
308 Oil pump
310 Pressure regulator
312 Excess oil returned to Suction port
314 Suction port
316 Oil Sump
318 Oil filter
320 Filtered oil being sent to engine bearings etc.
322 Pressurised oil
324 Oil pump
326 Pressure regulator
328 Two stage regulator diverts excess oil to piston sprays or other areas before returning oil to pump or sump
330 Then any additional excess oil is returned to Suction port or sump
332 Oil sump
334 Piston sprays on slider block
336 Piston
338 Connecting rod
340 Slider block
342 Connecting rod
344 Piston
346 Piston sprays in engine block that are fed from the two stage pressure regulator
348 Piston
350 Connecting rod
352 Slider block
354 Connecting rod
356 Piston
358 Piston
360 Connecting rod
362 Slider block
364 Connecting rod
366 Piston
368 Piston sprays in engine block that are fed from excess oil from slider block. Slider block oil gallery aligns with spray nozzle and supplies oil to jet at the top and bottom of each stroke (jets closed in this view)
370 Piston sprays in engine block that are fed from excess oil from slider block. Slider block oil gallery aligns with spray nozzle and supplies oil to jet at the top and bottom of each stroke (top jet open in this view)
372 Piston
374 Connecting rod
376 Slider block
378 Connecting rod 380 Piston
382 Notches in edge of bearing faces (6 shown here) to allow oil to leak past the thrust face and out the side of the bearing to lubricate the sides of the bearing and the associated thrust faces. This also applies to the side of the crank flange faces
384 Slider bearing
386 Bolt
388 Slider bearing
390 Crankshaft bearing
392 Bolt
394 Angled slider block with side notches in all bearings for side lubrication
396 Pre-set regulator in lube circuit
398 Oil filter
400 Filtered oil being sent to engine bearings etc.
402 Pre-set regulator
404 At a pre-set pressure flow, this regulator diverts filtered oil to the piston sprays etc.
406 Main pressure regulator
408 Excess oil returned to Suction port
410 Oil sump
412 Pressurised oil
414 Oil pump
416 Typical Standard Valve
418 Lube to engine parts
420 Filter
422 Pressure
424 Pump
426 Suction
428 Oil strainer
430 Return
432 Oil sump
434 Regulator Valve
436 Two Stage Blow-off
438 Lubrication to engine parts
440 Filter
442 Pressure
444 Pump
446 Suction
448 Oil strainer
450 Oil sump
452 Return
454 To piston jets (primary blow-off path)
456 Two stage regulator
458 Secondary blow-off path
460 Blow-off (Intermediate) regulator
462 Lubrication to engine parts
464 Filter
466 Pressure
468 Pump
470 Suction
472 Oil strainer
474 Oil sump
476 Return
478 Main regulator (45 psi)
480 To piston jets etc
482 30 psi
484 Intermediate regulator
486 Twist
488 Misalignment
490 Axial spacing
492 Pins allow for bore misalignment and twist in all directions including crank to bore misalignment. Crankshaft shoulders allow piston connecting rods to self-centre
494 Guide shoulders on crank for slider bearing (both edges/sides of slider block)
496 Axial spacing
498 Misalignment
500 Twist
502 Slider bearing side guides in connecting rod
504 Guide shoulders on crank
506 Crank assembly
508 Gear—crankshaft
510 Key
512 Crankshaft
514 Plug—crankshaft
516 Pin—dowel
518 Trigger—wheel
520 Pin—dowel
522 Screw—trigger wheel
524 C-claw of connecting rod
526 Reverse C-claw of connecting rod
528 Slider block components
530 Intake system
532 Injection system
534 Cooling system
536 Cylinder head
538 Valve train
540 Timing drive
542 Exhaust system
544 Colling system
546 Throttle body
548 Cylinder head
550 Cylinder head
552 Cyclonic airflow in chamber
554 Air in
556 SYTech firing order

The invention claimed is:

1. An internal combustion engine having a horizontally opposed cylinder arrangement, including at least one pair of pistons associated with a respective pair of opposed cylinders of the cylinder arrangement, and an output shaft, wherein each of the pistons is arranged for reciprocating motion within a respective one of the cylinders, driven by combustion, and wherein the pistons are coupled to the output shaft by a coupling such that said reciprocating motion of the pistons drives rotation of the output shaft, wherein the coupling includes a connecting rod moveably coupled to a respective pair of pistons such that each piston is permitted to centre within its associated cylinder, a slider bearing located for reciprocating movement relative to the connecting rod, and a crankshaft that is rotatably mounted within the slider bearing, the crankshaft having a pair of guide shoulders for supporting axial location relative to the slider bearing, each of the guide shoulders having an inner surface that faces the slider bearing that is larger in radius than an outer surface of the guide shoulder.

2. An internal combustion engine as claimed in claim 1, wherein each shoulder is spaced to provide a gap between the slider bearing and the shoulder.

3. An internal combustion engine as claimed in claim 2, wherein said gap is sufficient to allow relative movement of the slider bearing axially between the shoulder to allow the connecting rod to self-centre relative to the crankshaft.

4. An internal combustion engine as claimed in claim 1, wherein the connecting rod is coupled to the respective pair of opposed cylinders by a floating connection to accommodate bore misalignment.

5. An internal combustion engine as claimed in claim 4, wherein the floating connection accommodates twist in one or more directions.

6. An internal combustion engine as claimed in claim 4, wherein the floating connection accommodates crank to bore misalignment.

7. An internal combustion engine as claimed in claim 1, wherein the shoulders are tapered outwardly toward the slider bearing so as to provide a larger guide shoulder surface for abutment to limit movement relative to the slider bearing.

8. An internal combustion engine as claimed in claim 1, wherein the crankshaft is provided with a lubrication passage directed radially outwardly toward an inside surface of the slider bearing.

9. An internal combustion engine as claimed in claim 1, wherein the guide shoulder allows for self-aligning of the connecting rod.

10. An internal combustion engine as claimed in claim 1, wherein the crankshaft has a pair of opposed guide shoulders for guiding opposite sides of the slider bearing.

11. An engine as claimed in claim 1, wherein the coupling is arranged such that the piston has sinusoidal motion for constant rotational velocity of the output shaft when plotted against rotational angle of the output shaft.

12. An engine as claimed in claim 1, wherein the engine is in the form of a scotch yoke engine.

13. An engine as claimed in claim 1, wherein the engine is arranged such that, when measured against a conventional crankshaft engine of identical bore and stroke, the motion of the piston after top dead centre has a lower acceleration such that volumetric difference in the cylinder, when compared to the conventional crankshaft engine, peaks at between 10% and 20% between top dead centre and bottom dead centre.

14. An engine as claimed in claim 13, wherein the engine is arranged such that, when measured against a conventional crankshaft engine of identical bore and stroke, the motion of the piston after top dead centre has a lower acceleration such that volumetric difference in the cylinder peaks at between 40 and 80 degrees of output shaft rotation after top dead centre.

15. A method of manufacturing an engine as claimed in claim 1, including:
   measuring and/or modelling charge density in the cylinder to obtain data; and
   using said data to optimise one or more parameter(s) of the engine so as to increase maintenance of a gas state with a higher charge density around top dead centre to achieve improved mixing.

16. An internal combustion engine as claimed in claim 1, the connecting rod being formed from a pair of like parts fastened together, one of the like parts being reversed relative to the other of the like parts prior to fastening.

17. An internal combustion engine as claimed in claim 1, wherein the connecting rod has side guides for guiding the slider bearing.

18. An internal combustion engine as claimed in claim 1, wherein the internal combustion engine includes an intake system arranged to induce cyclonic airflow in a plenum chamber of the intake system.

* * * * *